(12) United States Patent
Cheng et al.

(10) Patent No.: US 11,109,400 B2
(45) Date of Patent: Aug. 31, 2021

(54) SEMI-AUTONOMOUS TRANSMISSIONS

(71) Applicant: Qualcomm Incorporated, San Diego, CA (US)

(72) Inventors: Peng Cheng, Beijing (CN); Chirag Patel, San Diego, CA (US); Vinay Chande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 16/334,071

(22) PCT Filed: Oct. 17, 2016

(86) PCT No.: PCT/CN2016/102256
§ 371 (c)(1),
(2) Date: Mar. 18, 2019

(87) PCT Pub. No.: WO2018/072058
PCT Pub. Date: Apr. 26, 2018

(65) Prior Publication Data
US 2020/0187228 A1    Jun. 11, 2020

(51) Int. Cl.
*H04W 72/12*    (2009.01)
*H04W 72/04*    (2009.01)
(Continued)

(52) U.S. Cl.
CPC ....... *H04W 72/1268* (2013.01); *H04L 1/1812* (2013.01); *H04W 72/042* (2013.01);
(Continued)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS

2012/0113910 A1* 5/2012 Jen .................. H04L 1/1854
                                                           370/329
2014/0348091 A1* 11/2014 Seo ................ H04L 5/0055
                                                           370/329
(Continued)

FOREIGN PATENT DOCUMENTS

CN    105101439 A  * 11/2015  .......... H04W 72/085
CN    105101439 A    11/2015
(Continued)

OTHER PUBLICATIONS

International Search Report and Written Opinion—PCT/CN2016/102256—ISA/EPO—dated Jul. 7, 2017.
(Continued)

*Primary Examiner* — Peter G Solinsky
*Assistant Examiner* — Sanjay K Dewan
(74) *Attorney, Agent, or Firm* — Holland & Hart LLP

(57) ABSTRACT

Methods, systems, and devices for wireless communication are described. A base station may identify a semi-static resource allocation for a device (e.g., a user equipment (UE)). The resource allocation may be associated with autonomous transmissions from the device in an unlicensed radio frequency spectrum band. The base station may generate and provide a message for transmission to the device. The message may convey an indication of the resource allocation. The device may receive the message and use the resource allocation to identify a transmission schedule for the autonomous transmissions.

106 Claims, 16 Drawing Sheets

(51) Int. Cl.
   *H04W 74/08* (2009.01)
   *H04L 1/18* (2006.01)
(52) U.S. Cl.
   CPC ... *H04W 72/0453* (2013.01); *H04W 72/1205* (2013.01); *H04W 72/1289* (2013.01); *H04W 74/0808* (2013.01)
(58) Field of Classification Search
   USPC .......................................................... 370/329
   See application file for complete search history.

(56) References Cited

U.S. PATENT DOCUMENTS

| | | | |
|---|---|---|---|
| 2016/0302226 A1 | 10/2016 | Kim et al. | |
| 2017/0223675 A1* | 8/2017 | Dinan | H04W 72/042 |
| 2017/0303303 A1* | 10/2017 | Yang | H04L 5/0053 |
| 2018/0007667 A1* | 1/2018 | You | H04W 72/12 |
| 2018/0014322 A1* | 1/2018 | Loehr | H04W 52/0206 |
| 2018/0019844 A1* | 1/2018 | Nogami | H04L 1/1812 |
| 2018/0124648 A1* | 5/2018 | Park | H04W 36/0072 |
| 2018/0176956 A1* | 6/2018 | Koutsimanis | H04W 74/0808 |
| 2018/0199359 A1* | 7/2018 | Cao | H04L 5/0094 |
| 2019/0021105 A1* | 1/2019 | Hamidi-Sepehr | H04W 72/1268 |
| 2019/0044639 A1* | 2/2019 | Ouchi | H04W 72/14 |
| 2019/0053222 A1* | 2/2019 | Bhorkar | H04W 16/14 |
| 2019/0090126 A1* | 3/2019 | Hayashi | H04W 72/0446 |
| 2019/0141728 A1* | 5/2019 | Takeda | H04L 27/2692 |
| 2019/0150148 A1* | 5/2019 | Ouchi | H04W 72/0413 370/336 |
| 2019/0181976 A1* | 6/2019 | Golitschek Edler von Elbwart | H04W 72/0453 |

FOREIGN PATENT DOCUMENTS

| | | | | |
|---|---|---|---|---|
| CN | 105848208 A | * | 8/2016 | ............ H04W 28/26 |
| CN | 105848208 A | | 8/2016 | |
| WO | WO 2015/172740 A1 | | 11/2015 | |
| WO | WO 2016/094640 A1 | | 6/2016 | |

OTHER PUBLICATIONS

Supplementary European Search Report—EP16919125—Search Authority—The Hague—dated Apr. 7, 2020.

* cited by examiner

SEMI-AUTONOMOUS TRANSMISSIONS

CROSS REFERENCES

The present application is a 371 national phase filing on International Application No. PCT/CN2016/102256 to Cheng et al., entitled "SEMI-AUTONOMOUS TRANSMISSIONS", filed Oct. 17, 2016.

BACKGROUND

The following relates generally to wireless communication, and more specifically to semi-autonomous transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some wireless systems, a device is operable to support autonomous transmissions, such as autonomous uplink (AUL) transmissions, using fixed or static resources. Such autonomous configured wireless systems may, however, be limited in some aspects due to channel contention in a heterogeneous wireless system. For example, devices may perform channel access procedures, such as a clear channel assessment (CCA) procedure or a listen-before-talk (LBT) procedure, prior to accessing the channel. This may create channel contention issues between devices of the wireless system, e.g., base station-to-UE contention, UE-to-UE contention, etc.

SUMMARY

The described techniques relate to improved methods, systems, devices, or apparatuses that support semi-autonomous transmissions. Generally, the described techniques provide for use of a semi-static resource allocation to support autonomous uplink (AUL) transmissions from a user equipment (UE) to a base station. The semi-static resource allocation may be associated with a semi-persistent scheduling (SPS) mode, a cross-transmission opportunity (cross-TxOP) mode, and the like. The described techniques support removal of the constraints of the base station contending for the medium to send uplink grants for each uplink transmission. Further, the described techniques support uplink transmissions without the uncertainties of the base station detecting the physical uplink shared channel (PUSCH) of an AUL wireless system.

For example, a first device (such as a MulteFire base station) may identify a semi-static resource allocation for a second device (such as a user equipment (UE)). The semi-static resource allocation may be associated with wireless communications, e.g. AUL, transmissions, from the second device in the unlicensed radio frequency spectrum band. The first device may generate and provide a message to the second device that conveys an indication of the semi-static resource allocation. The second device (e.g., the UE) obtains the message and identify a transmission schedule based on the semi-static resource allocation. The second device may provide information for transmission to the first device according to the transmission schedule.

An apparatus for wireless communication is described. The apparatus may comprise a processing system configured to: identify a resource allocation for a device, the resource allocation being associated with wireless communication in an unlicensed radio frequency spectrum band; and generate a message comprising an indication of the resource allocation; and an interface configured to: provide the message for transmission to the device.

In some aspects, the resource allocation comprises a semi-static resource allocation. In some aspects, the message comprises a radio resource control (RRC) message comprising a field in which the indication is conveyed. In some aspects, the resource allocation comprises a duration of an uplink TxOP associated with the wireless communication. In some aspects, the field comprises information associated with an autonomous transmission mode and SPS to be used by the apparatus and the device.

In some aspects, the resource allocation comprises a periodic schedule for transmission of one or more subframes by the device. In some aspects, the resource allocation comprises a frequency domain allocation for transmission of one or more subframes by the device. In some aspects, the frequency domain allocation is associated with one or more frequencies to be used by the device for frequency hopping, in some aspects, the message comprises downlink control information (DCI) that comprises the indication, and further wherein the interface is configured to provide the DCI via a physical downlink control channel (PDCCH).

In some aspects, the indication comprises at least one of a periodicity parameter, a scheduling parameter, or a duration of a TxOP associated with the wireless communication. In some aspects, the message indicates a cross-transmission opportunity (cross-TxOP) to be used by the apparatus and the device. In some aspects, the cross-TxOP comprises scheduling parameters identifying one or more time periods for transmission by the device.

In some aspects, the processing system is further configured to: identify, based at least in part on the message, a retransmission parameter, wherein the retransmission parameter comprises at least one of a value associated with a number of configured hybrid automatic repeat request (HARQ) processes, a retransmission identifier, or a sequential retransmission identifier. In some aspects, the interface is further configured to: obtain a result of a channel access procedure prior to providing the message. In some aspects, the channel access procedure comprises a full clear channel assessment (CCA) procedure.

In some aspects, the processing system is further configured to scramble DCI of the message using a SPS RNTI; and the message provided by the interface for transmission to the device comprises the scrambled DCI. In some aspects, the processing system is further configured to generate a second message, wherein the second message comprises an indicator releasing the resource allocation; and the interface is further configured to provide the second message for transmission to the device.

In some aspects, the processing system is further configured to scramble the indicator releasing the resource allocation using a SPS RNTI; and the second message provided by the interface for transmission to the device comprises the scrambled indicator releasing the resource allocation.

In some aspects, the interface is further configured to: obtain a retransmission of the wireless communication according to a retransmission scheme, in some aspects, the retransmission scheme comprises an asynchronous HARQ. In some aspects, the processing system is further configured to: calculate, based at least in part on a temporal parameter associated with the wireless communication and a HARQ process count value, a retransmission identifier; and wherein the interface is further configured to obtain the retransmission of the wireless communication based at least in part on the calculated retransmission identifier.

An apparatus for wireless communication is described. The apparatus may comprise: an interface configured to: obtain a message from a device, the message conveying an indication of a resource allocation; and a processing system configured to; identify, based at least in part on the resource allocation, a transmission schedule for wireless communication in an unlicensed radio frequency spectrum band; and wherein the interface is configured to provide information for transmission according to the transmission schedule.

In some aspects, the processing system is further configured to identify a semi-static configuration of the transmission schedule based at least in part on a semi-static parameter of the resource allocation; and the information is provided by the interface for transmission according to the identified semi-static configuration. In some aspects, the processing system is further configured to identify, based at least in part on the resource allocation, a duration of an uplink TxOP of the transmission schedule; and the information is provided by the interface for transmission during the duration of the uplink TxOP.

In some aspects, the processing system is further configured to select, based at least in part on the resource allocation, an autonomous transmission mode and semi-persistent scheduling (SPS) for transmission of the information according to the transmission schedule; and the information is provided by the interface for transmission using the selected autonomous transmission mode and the SPS. In some aspects, the processing system is further configured to select, based at least in part on the resource allocation, a periodicity of the transmission schedule; and the information is provided by the interface for transmission according to the selected periodicity of the transmission schedule.

In some aspects, the processing system is further configured to select, based at least in part on the resource allocation, a retransmission scheme for retransmission of the information; and the information is provided by the interface for transmission for transmission via the selected one or more frequencies. In some aspects, the processing system is further configured to select, based at least in part on the resource allocation, a frequency hopping scheme for transmission of the information according to the transmission schedule; and the information is provided by the interface for transmission using the selected frequency hopping scheme.

In some aspects, the processing system is further configured to select, based at least in part on the resource allocation, a cross-transmission opportunity (cross-TxOP) for transmission of the information according to the transmission schedule; and the information is provided by the interface for transmission during the selected cross-TxOP. In some aspects, the processing system is further configured to select, based at least in part on the resource allocation, a retransmission scheme for retransmission of the information; and the interface is further configured to provide the retransmission of the at least a portion of the information according to the selected retransmission scheme. In some aspects, the retransmission scheme comprises an asynchronous HARQ scheme.

In some aspects, the interface is configured to obtain a result of a channel access procedure prior to providing the information for transmission. In some aspects, the channel access procedure comprises at least one of a full CCA procedure, a one-shot CCA procedure, or a short CCA procedure. In some aspects, the processing system is further configured to: descramble downlink control information (DCI) of the message using a semi-persistent scheduling (SPS) radio network temporary identifier (RNTI); and obtain the resource allocation based at least in part on the descrambled DCI.

In some aspects, the interface is further configured to obtain a second message from the device, wherein the second message comprises an indicator releasing the resource allocation; the processing system is further configured to modify the transmission schedule based at least in part on the indicator releasing the resource allocation; and the interface is further configured to stop providing the information for transmission based at least in part on the modified transmission schedule.

A method for wireless communication is described. The method may comprise: identifying a resource allocation for a device, the resource allocation being associated with wireless communication in an unlicensed radio frequency spectrum band; generating a message comprising an indication of the resource allocation; and providing the message for transmission to the device.

In some aspects, the resource allocation comprises a semi-static resource allocation, in some aspects, the message comprises a RRC message comprising a field ha which the indication is conveyed. In some aspects, the field comprises information associated with an autonomous transmission mode and SPS to be used by an apparatus and the device. In some aspects, the resource allocation comprises a duration of an uplink TxOP associated with the wireless communication. In some aspects, the resource allocation comprises a periodic schedule for transmission of one or more subframes by the device.

In some aspects, the resource allocation comprises a frequency domain allocation for transmission of one or more subframes by the device. In some aspects, the frequency domain allocation is associated with one or more frequencies to be used by the device for frequency hopping. In some aspects, the message comprises DCI that comprises the indication, further comprising: providing the ICI via a PDCCH. In some aspects, the indication comprises at least one of a periodicity parameter, a scheduling parameter, or a duration of a TxOP associated with the wireless communication.

In some aspects, the message indicates a cross-TxOP to be used by an apparatus and the device. In some aspects, the cross-TxOP comprises scheduling parameters identifying one or more time periods for transmission by the device. In some aspects, the method comprises: identifying, based at least in part on the message, a retransmission parameter, wherein the retransmission parameter comprises at least one of a value associated with a number of configured HARQ processes, a retransmission identifier, or a sequential retransmission identifier.

In some aspects, the method comprises: obtaining a result of a channel access procedure prior to providing the message. In some aspects, the channel access procedure comprises a full CCA procedure. In some aspects, the method of claim 36, further comprising: scrambling DCI of the message using a SPS RNTI, wherein the message provided for transmission to the device comprises the scrambled DCI.

In some aspects, the method comprises: generating a second message, wherein the second message comprises an indicator releasing the resource allocation; and providing the second message for transmission to the device. In some aspects, the method comprises: scrambling the indicator releasing the resource allocation using a SPS RNTI, wherein the second message provided for transmission to the device comprises the scrambled indicator releasing the resource allocation.

In some aspects, the method comprises: obtaining a retransmission of the wireless communication according to a retransmission scheme. In some aspects, the retransmission scheme comprises an asynchronous HARQ. In some aspects, the method comprises: calculating, based at least in part on a temporal parameter associated with the wireless communication and a HARQ process count value, a retransmission identifier; and obtaining the retransmission of the wireless communication based at leas in part on the calculated retransmission identifier.

A method for wireless communication is described. The method may comprise: obtaining a message from a device, the message conveying an indication of a resource allocation; identifying, based at least in part on the resource allocation, a transmission schedule for wireless communication in an unlicensed radio frequency spectrum band; and providing information for transmission according to the transmission schedule.

In some aspects, the method comprises: identifying a semi-static configuration of the transmission schedule based at least in part on a semi-static parameter of the resource allocation, wherein the information is provided for transmission according to the identified semi-static configuration. In some aspects, the method comprises: identifying, based at least in part on the resource allocation, a duration of an uplink TxOP of the transmission schedule, wherein the information is provided for transmission during the duration of the uplink TxOP.

In some aspects, the method comprises: selecting, based at least in part on the resource allocation, an autonomous transmission mode and SPS for transmission of the information according to the transmission schedule, wherein the information is provided for transmission using the selected autonomous transmission mode and the SPS. In some aspects, the method comprises: selecting, based at least in part on the resource allocation, a periodicity of the transmission schedule, wherein the information is provided for transmission according to the selected periodicity of the transmission schedule.

In some aspects, the method comprises: selecting, based at least in part on the resource allocation, a retransmission scheme for retransmission of the information, wherein the information is provided for transmission for transmission via the selected one or more frequencies. In some aspects, the method comprises: selecting, based at least in part on the resource allocation, a frequency hopping scheme for transmission of the information according to the transmission schedule, wherein the information is provided for transmission using the selected frequency hopping scheme.

In some aspects, the method comprises: selecting, based at least in part on the resource allocation, a cross TxOP for transmission of the information according to the transmission schedule, wherein the information is provided for transmission during the selected cross-TxOP. In some aspects, the method comprises: selecting, based at least in part on the resource allocation, a retransmission scheme for retransmission of the information; and providing the retransmission of the at least a portion of the information according to the selected retransmission scheme. In some aspects, the retransmission scheme comprises an asynchronous hybrid automatic repeat request (HARQ) scheme.

In some aspects, the method comprises: obtaining a result of a channel access procedure prior to providing the information for transmission. In some aspects, the channel access procedure comprises at least one of a full CCA procedure, a one-shot CCA procedure, or a short CCA procedure. In some aspects, the method comprises: descrambling DCI of the message using a SPS RNTI; and obtaining the resource allocation based at least in part on the descrambled DCI.

In some aspects, the method comprises: obtaining a second message from the device, wherein the second message comprises an indicator releasing the resource allocation; modifying the transmission schedule based at least in part on the indicator releasing the resource allocation; and stopping providing the information for transmission based at least in part on the modified transmission schedule.

An apparatus for wireless communication is described. The apparatus may comprise: means for identifying a resource allocation for a device, the resource allocation being associated with wireless communication in an unlicensed radio frequency spectrum band; means for generating a message comprising an indication of the resource allocation; and means for providing the message for transmission to the device.

In some aspects, the resource allocation comprises a semi-static resource allocation. In some aspects, the message comprises a RRC message comprising a field in which the indication is conveyed. In some aspects, the field comprises information associated with an autonomous transmission mode and SPS to be used by the method and the device. In some aspects, the resource allocation comprises a duration of an uplink TxOP associated with the wireless communication. In some aspects, the resource allocation comprises a periodic schedule for transmission of one or more subframes by the device. In some aspects, the resource allocation comprises a frequency domain allocation for transmission of one or more subframes by the device. In some aspects, the frequency domain allocation is associated with one or more frequencies to be used by the device for frequency hopping.

In some aspects, the message comprises DCI that comprises the indication, further comprising: means for providing the DCI via a PDCCH. In some aspects, the indication comprises at least one of a periodicity parameter, a scheduling parameter, or a duration of a TxOP associated with the wireless communication. In some aspects, the message indicates a cross-TxOP to be used by an apparatus and the device. In some aspects, the cross-TxOP comprises scheduling parameters identifying one or more time periods for transmission by the device.

In some aspects, the apparatus comprises: means for identifying, based at least in part on the message, a retransmission parameter, wherein the retransmission parameter comprises at least one of a value associated with a number of configured HARQ processes, a retransmission identifier, or a sequential retransmission identifier. In some aspects, the apparatus comprises: means for obtaining a result of a channel access procedure prior to providing the message. In some aspects, the channel access procedure comprises a full CCA procedure. In some aspects, the apparatus comprises: means for scrambling DCI of the message using a SPS RNTI, wherein the message provided for transmission to the device comprises the scrambled DCI.

In some aspects, the apparatus comprises: means for generating a second message, wherein the second message comprises an indicator releasing the resource allocation; and means for providing the second message for transmission to the device. In some aspects, the apparatus comprises: means for scrambling the indicator releasing the resource allocation using a SPS RNTI, wherein the second message provided for transmission to the device comprises the scrambled indicator releasing the resource allocation.

In some aspects, the apparatus comprises: means for obtaining a retransmission of the wireless communication according to a retransmission scheme. In some aspects, the retransmission scheme comprises an asynchronous HARQ. In some aspects, the apparatus comprises: means for calculating; based at least in part on a temporal parameter associated with the wireless communication and a HARQ process count value, a retransmission identifier; and means for obtaining the retransmission of the wireless communication based at least in part on the calculated retransmission identifier.

An apparatus for wireless communication, is described. The apparatus may comprise: means for obtaining a message from a device, the message conveying an indication of a resource allocation; means for identifying, based at least in part on the resource allocation, a transmission schedule for wireless communication in an unlicensed radio frequency spectrum band; and means for providing information for transmission according to the transmission schedule.

In some aspects, the apparatus comprises: means for identifying a semi-static configuration of the transmission schedule based at least in part on a semi-static parameter of the resource allocation, wherein the information is provided for transmission according to the identified semi-static configuration. In some aspects, the apparatus comprises: means for identifying, based at least in part on the resource allocation, a duration of an uplink TxOP of the transmission schedule, wherein the information is provided for transmission during the duration of the uplink TxOP. In some aspects, the apparatus comprises: means for selecting, based at least in part on the resource allocation, an autonomous transmission mode and SPS for transmission of the information according to the transmission schedule, wherein the information is provided for transmission using the selected autonomous transmission mode and the SPS.

In some aspects, the apparatus comprises: means for selecting, based at least in part on the resource allocation, a periodicity of the transmission schedule, wherein the information is provided for transmission according to the selected periodicity of the transmission schedule. In some aspects, the apparatus comprises: means for selecting, based at least in part on the resource allocation, a retransmission scheme for retransmission of the information, wherein the information is provided for transmission for transmission via the selected one or more frequencies. In some aspects, the apparatus comprises: means for selecting, based at least in part on the resource allocation, a frequency hopping scheme for transmission of the information according to the transmission schedule, wherein the information is provided for transmission using the selected frequency hopping scheme.

In some aspects, the apparatus comprises: means for selecting, based at least in part on the resource allocation, a cross-TxOP for transmission of the information according to the transmission schedule, wherein the information is provided for transmission during the selected cross-TxOP. In some aspects, the apparatus comprises: means for selecting, based at least in part on the resource allocation, a retransmission scheme for retransmission of the information; and means for providing the retransmission of the at least a portion of the information according to the selected retransmission scheme. In some aspects, the retransmission scheme comprises an asynchronous HARQ scheme.

In some aspects, the apparatus comprises: means for obtaining a result of a channel access procedure prior to providing the information for transmission. In some aspects, the channel access procedure comprises at least one of a full CCA procedure, a one-shot CCA procedure, or a short CCA procedure. In some aspects, the apparatus comprises: means for descrambling DCI of the message using a SPS RNTI; and means for obtaining the resource allocation based at least in part on the descrambled DCI.

In some aspects, the apparatus comprises: means for obtaining a second message from the device, wherein the second message comprises an indicator releasing the resource allocation; means for modifying the transmission schedule based at least in part on the indicator releasing the resource allocation; and means for stopping providing the information for transmission based at least in part on the modified transmission schedule.

A computer readable medium storing code for wireless communication at an apparatus is described. The code comprising instructions executable to cause a processor to: identify a resource allocation for a device, the resource allocation being associated with wireless communication in an unlicensed radio frequency spectrum band; generate a message comprising an indication of the resource allocation; and provide the message for transmission to the device.

A computer readable medium storing code for wireless communication at an apparatus is described. The code comprising instructions executable to cause a processor to: obtain a message from a device, the message conveying an indication of a resource allocation; identify, based at least in part on the resource allocation, a transmission schedule for wireless communication in an unlicensed radio frequency spectrum band; and provide information for transmission according to the transmission schedule.

A base station is described. The base station may comprise: a processing system configured to: identify a resource allocation for a device, the resource allocation being associated with wireless communication in an unlicensed radio frequency spectrum band; and generate a message comprising an indication of the resource allocation; and a transmitter configured to transmit the message to the device.

A user equipment is described. The user equipment may comprise: a receiver configured to obtain a message from a device, the message conveying an indication of a resource allocation; and a processing system configured to; identify, based at least in part on the resource allocation, a transmission schedule for wireless communication in an unlicensed radio frequency spectrum band; and a transmitter configured to transmit information according to the transmission schedule.

DETAILED DESCRIPTION

Figure 1:
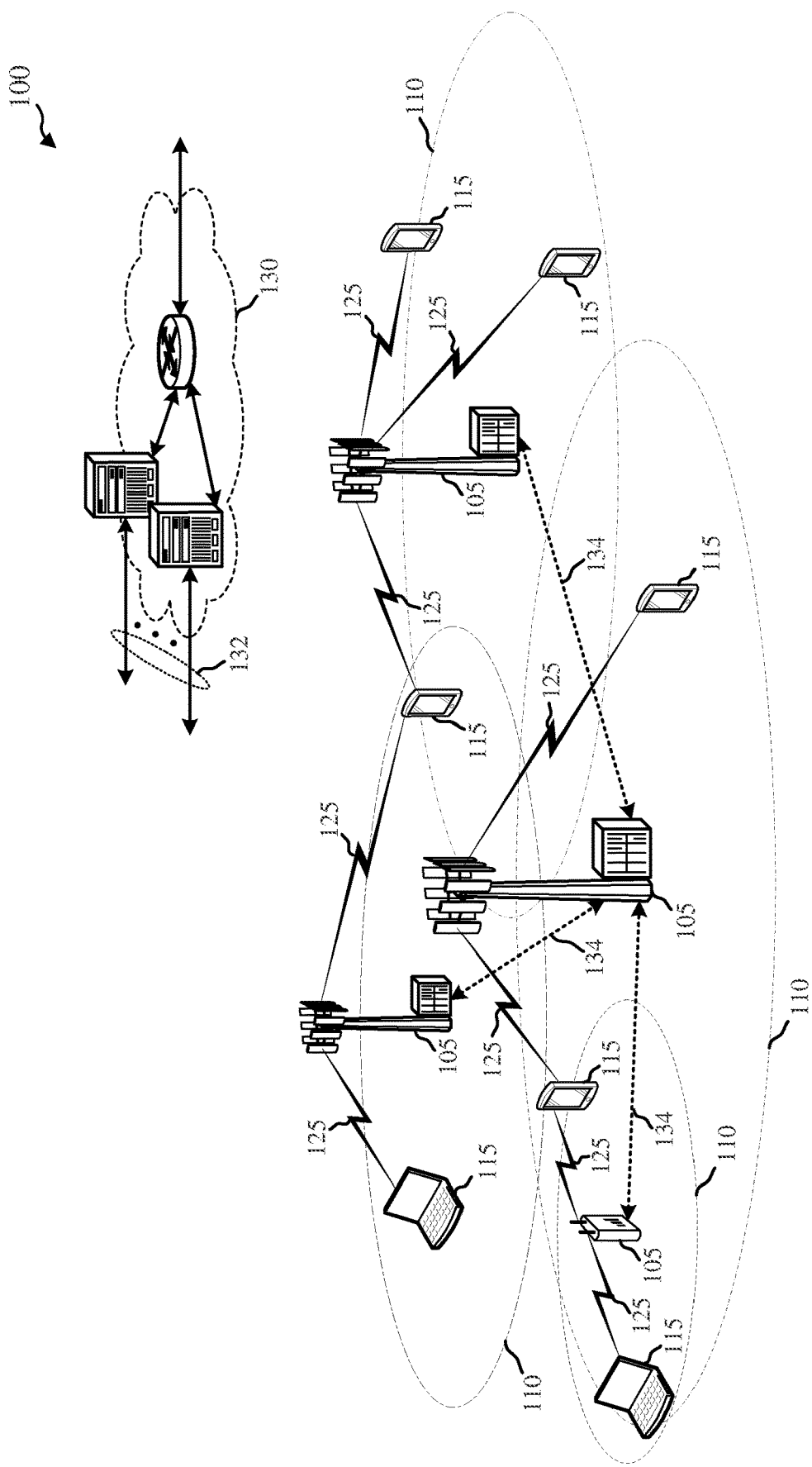
FIG. 1 illustrates an example of a system for wireless communication that supports semi-autonomous transmissions in accordance with aspects of the present disclosure.

A device, such as a user equipment (UE), may benefit from operating in an autonomous (i.e., unscheduled) uplink (AUL) mode or the UE may benefit from operating in a grant-based (i.e., scheduled) uplink mode, depending on various factors within a system. In an AUL mode, the UE, may make unscheduled uplink transmissions in an unlicensed radio frequency spectrum band, while in a grant-based mode the UE may make uplink transmissions using resources assigned (i.e., scheduled) with a grant from the base station.

By way of example, grant-based deployments may sometimes provide for more efficient resource utilization compared to distributed (e.g. AUL, unscheduled, or non-scheduled) wireless communication systems. But when a scheduled uplink scheme coexists with a non-scheduled uplink scheme, the former may suffer a disadvantage in channel access. This disadvantage may be a result of various scenarios or factors, including the following three factors (referred to as a triple contention scenario): first, a base station a, operating in a scheduled uplink system, may perform a listen-before-talk (LBT) procedure before sending a grant, which may result in contention with other Wi-Fi access points (APs) or user equipment (UEs); second, the uplink scheduling or UE selection may cause another internal contention within the base station; third, the scheduled UE may also individually perform LBT.

Due at least in part to these three factors, scheduled or grant-based implementations (e.g., within a MulteFire systems) coexisting with unscheduled or autonomous implementations may affect uplink data rates compared to those achieved with standalone unscheduled or autonomous wireless communication systems (e.g. Wi-Fi systems or certain MulteFire deployments). The capability to utilize aspects of both scheduled and unscheduled modes of operation may be beneficial to a UE.

A wireless communication system may realize more efficient medium access by operating in an AUL transmission mode based on a semi-static resource allocation. In such an AUL mode, the UE may communicate with a base station based on uplink resources that are semi-static or periodic, e.g., resources that are scheduled for a fixed time period or according to a schedule. Compared to a purely grant-based uplink mode, operating in a semi-static resource allocation based AUL mode may provide more efficient communication because of a relative reduction in overhead (e.g., control signaling) and complexity.

For example, the base station may identify a semi-static resource allocation for a device, such as a UE. The semi-static resource allocation may be associated with or used for wireless communications, such as AUL transmissions, from the UE in an unlicensed radio frequency spectrum band. The semi-static resource allocation may be based on a semi-persistent scheduling (SPS) scheme, a cross-transmission opportunity (cross-TxOP) scheme, or some other communication configuration that uses semi-static resources. The base station may transmit a message to the UE that conveys an indication of the semi-static resource allocation. The UE may receive the message and identify a transmission schedule based on the semi-static resource allocation. The UE may provide information for transmission to the base station according to the transmission schedule.

Aspects of the disclosure introduced above are further described below with reference to a wireless communication system. These and other features are further illustrated by and described with reference to apparatus diagrams, system diagrams, and flowcharts that relate to semi-autonomous uplink in MulteFire.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Additionally or alternatively, wireless communications system 100 may be an example of a wireless local area network (WLAN) (e.g., a Wi-Fi network) or a MulteFire network.

The wireless communications system 100 may include an access point (AP) and multiple associated UEs 115, which may represent devices such as wireless stations, mobile stations, personal digital assistant (PDAs), other handheld devices, netbooks, notebook computers, tablet computers, laptops, display devices (e.g., TVs, computer monitors, etc.), printers, etc. A UE 115 may also be referred to as a device, a mobile station, a subscriber station, a remote unit, a wireless device, an access terminal (AT), a handset, a user agent, a client, cellular phone, a wireless modem, a handheld device, a personal computer, a tablet, a personal electronic device, a machine type communication (MTC) device, or the like.

When wireless communications system 100 is configured as a MulteFire network, the AP may be configured as a MulteFire eNB or base station. For example, wireless communications system 100 may include aspects of an LTE/LTE-A network, a Wi-Fi network, a MulteFire network, a neutral host small cell network, or the like, operating with overlapping coverage areas. A MulteFire network may include access points (APs) and/or base stations 105 communicating with UEs 115 in an unlicensed radio frequency spectrum band, e.g., without a licensed frequency anchor carrier. For example, the MulteFire network may operate without an anchor carrier in the licensed spectrum. Wireless communications system 100 may support semi-static based resources for semi-autonomous transmissions which may, e.g., increase the efficiency of MulteFire communications within system 100.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. Although a base station 105 may generally refer to aspects of wireless wide area networks (WWANs) and an AP may generally refer to aspects of WLANs, base station and AP may be used interchangeably. As discussed below, a base station 105 may identify a semi-static resource allocation to be used for AUL transmissions from the UE 115 to base station 105 and may configure the UE 115 accordingly.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105. Base stations 105 may also be MulteFire base stations 105, which may have limited or non-ideal backhaul links 134 with other base stations 105.

As mentioned, UE 115s, APs, and base stations 105 may operate in a shared or unlicensed radio frequency spectrum band. These devices may perform a clear channel assessment (CCA) prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence. The frequency and timing of CCA may affect the frequency with which a UE 115 is able to access a shared or unlicensed channel.

UEs 115 and base stations 105 may employ a hybrid automatic repeat request (HARQ) feedback mechanism, which may be a method of ensuring that data is received correctly over a wireless communication link 125. HARQ may include a combination of error detection (e.g., using a cyclic redundancy check (CRC), forward error correction (FEC), and retransmission (e.g., automatic repeat request (ARQ)). HARQ may improve throughput at the media access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a negative acknowledgement (HACK) indicating a failed attempt to decode the information. The chain of transmission, response and retransmission may be referred to as a HARQ process. In some cases, a limited number of HARQ processes may be used for a given communication link 125.

In some cases, wireless communications system 100 may utilize both licensed and unlicensed radio frequency spectrum bands. For example, wireless communications system 100 may employ LTE License. Assisted Access (LTE-LAA) or LTE Unlicensed (LTE U) radio access technology in an unlicensed band such as the 5 GHz Industrial, Scientific, and Medical (ISM) band. (The ISM band may also be used for other communications, such as MulteFire or Wi-Fi.) When operating in unlicensed radio frequency spectrum bands, wireless devices such as base stations 105 and UEs 115 may employ listen-before-talk (LBT procedures, such as a CCA, to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Bidirectional communications may use FDD (e.g., using paired spectrum resources) or TDD operation (e.g., using unpaired spectrum resources). Frame structures for FDD (e.g., frame structure type 1) and TDD (e.g., frame structure type 2) may be defined. For TDD frame structures, each subframe may carry uplink or downlink traffic, and special subframes may be used to switch between downlink and uplink transmission. Allocation of uplink and downlink subframes within radio frames may be symmetric or asymmetric and may be statically determined or may be reconfigured semi-statically, Special subframes may carry downlink or uplink traffic and may include a Guard Period (GP) between downlink and uplink traffic. Switching from uplink to downlink traffic may be achieved by setting a timing advance at the UE 115 without the use of special subframes or a guard period. UL-DL configurations with switch-point periodicity equal to the frame period (e.g., 10 ms) or half of the frame period (e.g., 5 ms) may also be supported.

For example, TDD frames may include one or more special frames, and the period between special frames may determine the TDD DL-to-UL switch-point periodicity for the frame. Use of TDD offers flexible deployments without requiring paired UL-DL spectrum resources. In some TDD network deployments, interference may be caused between uplink and downlink communications (e.g., interference between uplink and downlink communication from different base stations, interference between uplink and downlink communications from base stations and UEs, etc.). For example, where different base stations 105 serve different UEs 115 within overlapping coverage areas according to different TDD UL-DL configurations, a UE 115 attempting to receive and decode a downlink transmission from a serving base station 105 may experience interference from uplink transmissions from other, proximately located UEs 115.

Each frame may include ten 1 ms subframes numbered from 0 to 9; other frame structures may also be employed, as discussed below. A subframe may be further divided into two 0.5 ms slots, each of which contains 6 or 7 modulation symbol periods (depending on the length of the cyclic prefix prepended to each symbol), A resource element may consist of one symbol period and one subcarrier (a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements.

Excluding the cyclic prefix, each symbol may contain 2048 sample periods. In some cases the subframe may be the smallest scheduling unit, also known as a transmission time interval. In other cases, a TTI may be shorter than a subframe or may be dynamically selected (e.g., in short TTI bursts or in selected component carriers using short TTIs). A subframe may have different structures depending on the type and direction of information to be transmitted. A subframe type may be an uplink subframe, a downlink subframe, or a special (S) subframe. Special subframes may facilitate a switch front downlink to uplink transmission. Further the structure of a subframe may vary in terms of length.

Other frame structures may also be employed in wireless communications system 100. In some cases, wireless communications system 100 may be organized by transmission opportunities (TxOPs), which may be organized according to the frame structure described above and which a may be separated by periods of time during which the wireless medium may be unavailable for devices (e.g., UEs 115 or base stations 105) within wireless communications system 100.

A base station 105 and/or a UE 115 may benefit from operating in an AUL mode that is based on a semi-static resource allocation by reducing signaling overhead, increasing detection, etc. A base station 105 may identify a semi-static resource allocation for a device, such as a UE 115. The semi-static resource allocation may be associated with or used for wireless communications, such as AUL transmissions, from the UE 115 to the base station 105 in an unlicensed radio frequency spectrum band. The semi-static resource allocation may be based on a SPS mode, a cross-TxOP mode, or other similar mode of communications. The base station 105 may generate and transmit a message to the UE 115 that conveys an indication of the semi-static resource allocation. The UE 115 may receive the message conveying the indication of the semi-static resource allocation and identify a transmission schedule for the AUL transmissions. The transmission schedule may include one or more subframes associated with an uplink grant for the UE 115. The UE 115 may send the AUL transmissions to the base station 105 according to the transmission schedule.

Figure 2:
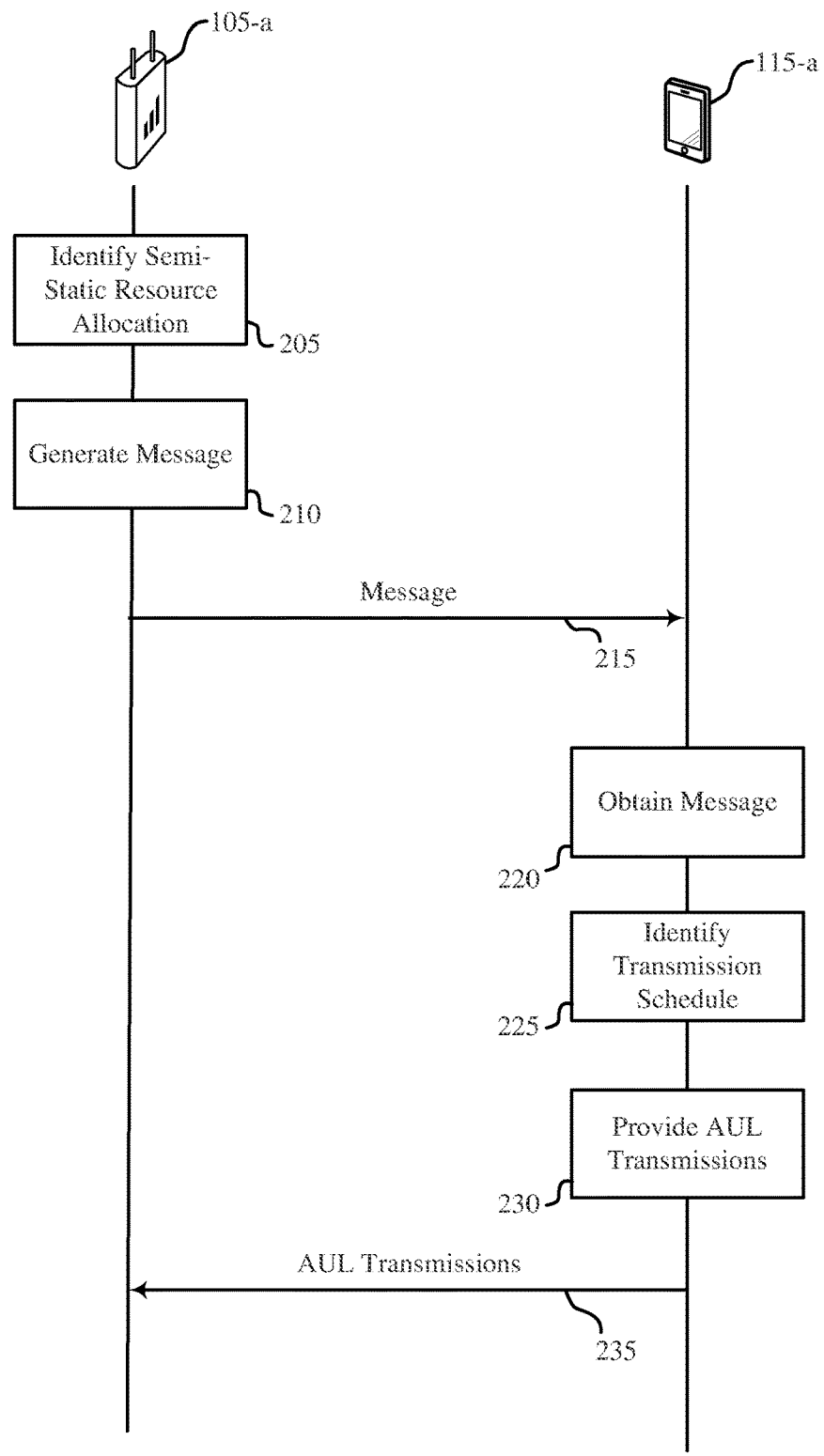
FIG. 2 illustrates an example of a process flow that supports semi-autonomous transmissions in accordance with aspects of the present disclosure.

FIG. 2 illustrates an example of a process flow 200 for semi-autonomous transmissions. Process flow 200 may implement one or more aspects of wireless communication system 100 of FIG. 1. Process flow 200 may include a base station 105-a and a UE 115-a, which may be examples of the corresponding devices described herein.

Generally, process flow 200 may support semi-static based AUL transmissions between the UE 115-a and the base station 105-a, The AUL transmissions may be based on an SPS mode or a cross-TxOP mode. For the SPS based mode, the UE 115-a is configured for the uplink SPS and will regard uplink grants as recurring periodically, which may remove the constraint of base station 105-a having to contend for the medium to send multiple uplink grants. During each SPS period, UE 115-a may perform an uplink LBT procedure prior to sending each AUL transmission. For the cross-TxOP based mode, after indicating through downlink control information (DCI) in a cross-TxOP uplink grant, the UE 115-a may know which set of subsequent uplink subframes have an associated uplink grant. During these subsequent subframes, the UE 115-a may perform a LBT procedure prior to sending each AUL transmission.

At 205, the base station 105-a may identify a semi-static resource allocation. The semi-static resource allocation may be associated with AUL transmissions from the UE 115-a to the base station 105-a in an unlicensed frequency spectrum band.

At 210, the base station 105-a may generate a message that conveys an indication of the semi-static resource allocation.

In an example where the semi-static resource allocation is based on an AUL mode using SPS, the message may be a radio resource control (RRC) message. The semi-static resource allocation may include an SPS uplink grant. The base station 105-a may configure a field of the RRC message to convey the indication of the semi-static resource allocation. For example, the base station 105-a may configure an "sps-configAUL" field, which may also be referred to as a SPS for AUL configuration field, of the RRC message. The configured semi-static resource allocation may convey an indication of a duration of a transmission opportunity (TAP) associated with the AUL transmissions.

In some aspects, the semi-static resource allocation may include or be associated with a periodic schedule associated with subsequent subframe(s) to be used for the AUL transmissions. In some aspects, the semi-static resource allocation may include or be associated with a frequency domain allocation associated with subsequent subframe(s) to be used for the AUL transmissions. The frequency domain allocation may include one or more frequencies that hop across the subsequent subframe(s). The base station 105-a may scramble the DCI for the uplink grant using an SPS radio network temporary identifier (RNTI).

In some aspects, the base station 105-a may configure the field of the RRC message (e.g., the sps-configAUL field) according to the following example:

```
SPS-ConfigAUL : : = Choice {
    release                         NULL
    setup                           SEQUENCE {
        semiPersistSchedIntervalAUL    ENUMERATED {
                                          sf4, sf6, sf8, sf10, sf20, sf32, sf40,
                                          sf64, sf80, sf128, sf160, sf320,
                                          sf640, spare2, spare2, spare1},
        AULTXOPduration                ENUMERATED {
                                          4, 5, 6, 7, 8, 9, 10, ...}, %unit in ms
        implicitReleaseAfter           ENUMERATED {e2, e3, e4, e8},
        numberOfConfSPS-Processes      INTEGER (1 . . 8),
        p0-Persistent                  SEQUENCE {
            p0-NominalPUSCH-Persistent    INTEGER (-126 . . 24),
            p0-UE-PUSCH-Persistent        INTEGER (-8 . . 7)
        }   OPTIONAL,                     -- Need Op
    }
}
```

In some aspects, semiPersistSchedIntervalAUL may refer to a periodicity of AUL, e.g., the period of a recurring uplink grant, Different periods (e.g., 6 ms, 8 ms, etc.) may be used to handle different TxOP durations. AULTXOPduation may refer to the transmit opportunity duration of the AUL in milliseconds. The values may be defined in order to comply with federal communication commission (FCC) and other requirements for the TxOP, implicitReleaseAfter may refer to a number of consecutive media access control (MAC) protocol data units (PDUs) that contain no or 0 MAC service data units (SDUs) before release of the SPS-AUL (e.g., the SPS uplink grant).

numberOfConfSPS-Processes may refer to the number of configured RAW processes for SPS-AUL. The HARQ process(es) may be asynchronous processes, in some aspects. The p0-NominalPUSCH-Persistent and/or p0-UE-PUSCH-Persistent may refer to optional AUL power control parameters.

In some aspects, the base station 105-a may configure a DCI format bit field. The configured bit field may act as an SPS trigger for the UE 115-a, when configured. One example configuration of a DCI format bit field may include the following example:

| DCI format 0 | | |
|---|---|---|
| TPC command for scheduled PUSCH | set to '00' | Special Fields for SPS Activation and PDCCH Validation |
| Cyclic shift DM RS | set to '000' | |
| Modulation and Coding Scheme (MCS) and Redundancy Version | MSB is set to '0' | |
| HARQ Process Number | N/A | |
| MCS | N/A | |
| Redundancy Version | N/A | |
| DCI format 0 | | |
| TPC command for scheduled PUSCH | set to '00' | Special Fields for SPS Release and PDCCH Validation |
| Cyclic Shift DM RS | set to '000' | |
| MCS and Redundancy Version | set to '11111' | |
| Resource Block assignment and hopping resource allocation | Set to all '1's | |
| HARD process number | N/A | |
| MCS | N/A | |
| Redundancy Version | N/A | |
| Resource Block Assigittnent | N/A | |

In some aspects, UE 115-a may validate an SPS trigger in PDCCH if all or a predetermined number of the bit fields are met, e.g., satisfy a predetermined configuration or value.

In another example, the semi-static resource allocation is based on an AUL mode using cross-TxOP scheduling. Generally, the cross-TxOP scheduling implementation may be operate under a fixed timing scheme where the periodicity and TxOP may be sent or otherwise conveyed in the DCI of the cross-TxOP uplink grant. Compared with the AUL mode using SPS, this may provide increased flexibility because DCI indicator is faster than RRC configuration. For example, a periodic pattern (reduced payload) may be used or an identifiers of the subsequent subframe(s) (larger payload) may be indicated in cross-TxOP uplink grant. Additionally or alternatively, an uplink TxOP duration may be indicated.

In the cross-TxOP based AUL, the message may include a DCI message and the base station 105-a may configure a field of the PDCCH to convey the indication of the semi-static resource allocation. The configured field may include a periodicity parameter, a scheduling parameter, and/or a duration of an uplink TxOP associated with the AUL transmissions. The DCI message may be included in a cross-TxOP uplink grant, which may include an uplink scheduling parameter associated with subsequent subframe(s) that follow the subframe of the cross-TxOP uplink grant. Thus, the semi-static resource allocation may include an identifier of the subsequent subframe(s) to be used for the AUL transmissions.

In some aspects, the base station 105-a may send the DCI message that includes a periodic pattern (e.g., (CTsched-IntervalAUL) and/or a TxOP duration for the AUL transmissions. In some aspects, base station 105-a may send the DCI message that includes an identifier of the uplink subframe(s) set that are to be used for the future AUL transmissions and/or a TxOP duration. In some aspects, the RRC may define several uplink subframe sets and the DCI may indicate or point to a mapping to a particular subframe set.

In some aspects, the DCI message may include or convey an indication of a retransmission parameter. The transmission parameter may include a number of configured HARQ process(es), a retransmission identifier, and/or a sequential retransmission identifier.

At 215, the base station 105-a may transmit the message to UE 115-a. Base station 105-a may perform a CCA procedure before transmitting the message to the UE 115-a, e.g., a full CCA procedure. For example, a processing system of base station 105-a may generate the message and convey the message or information associated with the message to convey the indication of the semi-static resource allocation to an interface of base station 105-a.

At 220, the UE. 115-a may obtain the message that conveys the indication of the semi-static resource allocation. For example, an interface of UE 115-a may receive the message from base station 105-a and convey the message or decode the message and convey the indication of the semi-static resource allocation to a processing system of UE 115-a.

At 225, the UE 115-a may identify a transmission schedule based on the semi-static resource allocation, in the example where the semi-static resource allocation is based on AUL mode using SPS, identifying the transmission schedule may include decoding the field of the RRC message to obtain the indication of the semi-static resource allocation. The semi-static resource allocation may include a duration of an uplink TxOP that may be used to determine the transmission schedule. In some aspects, the semi-static resource allocation may include a periodic schedule associated with subsequent subframe(s) that may be used to determine the transmission schedule.

In some aspects, the UE 115-a may detect and validate the AUL SPS uplink grant. The UE 115-a may determine that the SPS uplink grant is associated with subframes based on $(10*SFN+subframe)=[(10*SFN_{start\ time}+subframe_{start\ time})+N*semiPeristSchedIntervalAUL]$ modulo 10240 (*). Where $FN_{start\ time}$ and $subframe_{start\ time}$ are the (subframe number) SFN and subframe, respectively, occurring at the time where the configured SPS uplink grant was (re-)initialized. The semiPersistSchedIntervalAUL may refer to the period of the AUL uplink grant configured in the RRC. Validating the AUL SPS uplink grant based on the cyclic redundancy check (CRC) parity bits obtained for the PDCCH payload being scrambled with the SPS C-RNTI.

In the example where the semi-static resource allocation is based on AUL mode using cross-TxOP scheduling, identifying; the transmission schedule may include decoding a field of the PDCCH to obtain the indication of the semi-static resource allocation. The field may include a periodicity parameter, a scheduling parameter, a duration of an uplink TxOP, etc., associated with the AUL transmissions that may be used to determine the transmission schedule. The DCI message may be included in a cross-TxOP uplink grant that includes scheduling parameters associated with subsequent subframe(s) that may be used to determine the transmission schedule.

In some aspects, UE 115-*a* may detect the DCI in the cross-TxOP uplink grant and identify the transmission schedule according to the following examples. In one alternative, the transmission schedule may be based on (10*SFN+subframe)=[(10*SFN$_{start\ time}$+subframe$_{start\ time}$)+ N*CTschedIntervalAUL] modulo 10240 (*). Where SFN$_{start\ time}$ and subframe$_{start\ time}$ are the (subframe number) SFN and subframe, respectively, occurring at the time where the configured SPS uplink grant was (re-)initialized, e.g., the first available SFN and uplink subframe having an uplink grant. In another alternative, the transmission schedule is based on the indicated uplink subframe set received in the DCI message.

At 230, the UE 115-*a* may provide the AUL transmissions for transmission to base station 105-*a*. For example, a processing system of UE 115-*a* may generate the AUL transmissions and provide them to an interface for transmission.

At 235, the UE 115-*a* may transmit the AUL transmissions to base station 105-*a*. In the example where the semi-static resource allocation is based on an AUL mode using SPS, at the start of the $n^{th}$ AUL period (e.g., subframe) the UE 115-*a* may contend for the medium using a short (e.g., one-shot) CCA procedure or a full CCA procedure. If the CCA procedure is successful, the UE 115-*a* may start the AUL transmission based on the TxOP specified in the RRC message.

In the example where the semi-static resource allocation is based on an AUL mode using cross-TxOP scheduling, at the start of the uplink subframes indicated in the DCI message, the UE 115-*a* may contend for the medium using a short (e.g., one-shot) CCA procedure or a full CCA procedure. If the CCS procedure is successful, the UE 115-*a* may start the AUL transmission based on the TxOP indicated in the DCI or specified in the RRC message.

In some aspects, the base station 105-*a* and/or UE 115-*a* may be configured to support a retransmission scheme. In some aspects, the retransmission scheme may be an asynchronous HARQ scheme. In the example where the semi-static resource allocation is based on an AUL mode using SPS, a HARQ process identifier may be calculated. For example, the HARQ process identifier may be calculated based on HARQ Process ID=[floor(CURRENT_TTI/semiPersistSchedIntervalAUL] modulo numberOf ConfSPS-Processes. The CURRENT_TTI may equal [(SFN*10)+ subframe number], which may refer to the TTI in which the AUL PUSCH has been received on the configured assignment. The serniPersistSchedIntervalAUL may be configured in the sps-configAUL of the RRC message, as discussed above. The numberOfConfSPS-Processes may be configured in the sps-configAUL of the RRC message, as also discussed above. Retransmission handling may include an explicit uplink grant addressed to SPS RNTI with NDI set to '1'. The HARQ process for retransmissions may be indicated in the uplink grant.

In the example where the semi-static resource allocation is based on an AUL mode using cross-TxOP scheduling, a HARQ process identifier may be calculated. For example, the HARQ process identifier may be calculated based on HARQ Process ID=[floor(CURRENT_TTI/CTSchedIntervalAUL] modulo numberOfHARQProcesses. The CURRENT_TTI may equal [(SFN*10)+subframe number], which may refer to the TTI in which the AUL PUSCH has been received on the configured assignment. The CTschedIntervalAUL may be indicated in the DCI of the cross-TxOP uplink grant. The numberOfConfSPS-Processes may be indicated in the DCI of the cross-TxOP uplink grant, or may be configured in the RRC message. In some aspects, the HARQ process identifier for multiple uplink subframes with uplink grants may be indicated in DCI or with some mapping (e.g., sequential HARQ-IDs). Retransmission handling may be explicitly indicated through DCI (cross-TxOP uplink grant) with NDI set to '1'. The HARQ process of retransmissions may be indicated in the uplink grant.

For either of the SPS based or cross-TxOP scheduling based examples, the frequency allocation (e.g., resource block allocation) may be semi-statically configured and/or updated using RRC signaling. The frequency allocation may hop across subframe(s) to improve decoding performance. For the cross-TxOP scheduling based example, the frequency allocation may also be indicated in the DCI.

In some aspects, the base station 105-*a* and/or UE 115-*a* may be configured to release the semi-static resource allocation. For example, the base station 105-*a* may generate and transmit a second message to the UE 115-*a* that includes an indicator releasing the semi-static resource allocation. The base station 105-*a* may transmit the second message on a PDCCH and scramble the second message using an SPS RNTI, in some examples.

Thus, process flow 200 may support the base station 105-*a* not having to blindly decode the PUSCH (e.g., in full AUL mode the base station 105-*a* would have to detect the presence of the PUSCH blindly and identity the identity of UE 115-*a* since base station 105-*a* may not know when an AUL burst starts).

Figure 3:
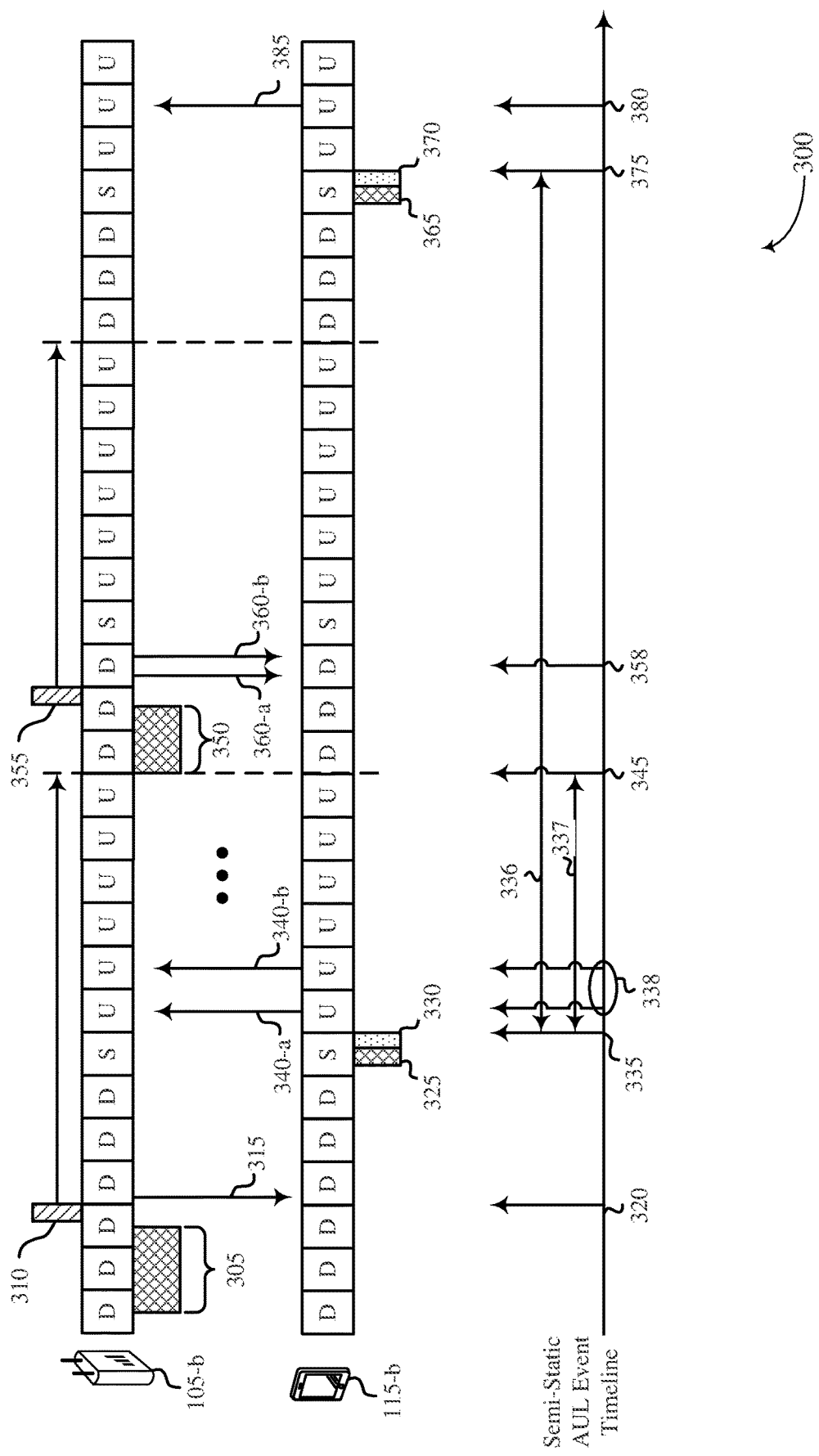
FIG. 3 illustrates an example of a AUL based communications that supports semi-autonomous transmissions in accordance with aspects of the present disclosure.

FIG. 3 illustrates an example of a AUL based communications 300 for semi-autonomous transmissions. AUL based communications 300 may implement one or more aspects of wireless communication system 100 and/or process flow 200 of FIGS. 1 and 2. AUL based communications 300 may illustrate an example of where the semi-static resource allocation is based on an AUL mode using SPS. AUL based communications 300 may include communications between a base station 105-*b* and a UE 115-*b*, which may be examples of the corresponding devices described herein.

As one non-limiting example, the AUL based communication 300 may have a serniPersistSchedIntervalAUL of 20 ms, a AULTXOPduration of 6 ms, and may illustrate an example of two HARQ processes. However, other intervals, durations, and/or HARQ processes may also be used in accordance with various aspects of the described techniques.

The base station 105-*b* may be in communication with UE 115-*b*. In the AUL based communications 300, base station 105-*b* may initiate a CCA procedure 305 to determine whether the channel is available for communication. Once it is determined that the channel is available, base station 105-*b* may then transmit a preamble 310, which may include a reservation signal (e.g., a clear to send (CTS) message) to reserve the medium for UL transmission, e.g., for the period indicated by the arrow and ending a time 345. For example, preamble 310 may indicate to UE 115-*b* that the medium is reserved for a given TxOP. In this example, the TxOP includes three downlink subframes, a special subframe followed by 6 ms (i.e., 6 consecutive 1 ms uplink subframes), but other durations may also be employed. Based on the preamble 310, base station 105-*b* may transmit at 315 a PDCCH that conveys an indication of the semi-static resource allocation (e.g., the SPS uplink grant). The PDCCH may be scrambled using the SPS RNTI, as discussed above.

Based on the PDCCH transmitted at 315, the SPS based AUL mode is active at time 320. The SPS uplink grant may also include a uplink grant delay (e.g., n+4 ms) that includes the three 1 ms downlink subframe and the 1 ms special subframe.

The UE 115-b may initiate CCA procedure at 325, and may transmit a busy signal 330 indicating that the channel is reserved. This process may occur during special subframe. The time 335 may be associated with the $SFN_{start\ time}$ and the $subframe_{start\ time}$, as discussed above. Thus, time 335 may be associated with the start of the AUL TxOP. The period 337 between time 335 and the time 345 may be associated with the AUL TxOP, which includes six 1 ms uplink subframes, in this example. The period 336 between the time 335 and the time 375 may be associated with the serniPersistSched-IntervalAUL, as also discussed above.

Accordingly, UE 115-b may begin transmitting AUL transmissions 340 during the period 337, e.g., AUL transmission 340-a during the first uplink subframe and AUL transmission 340-b during the second uplink subframe. AUL transmission 340-a may be associated with HARQ ID of '0' and AUL transmission 340-b may be associated with HARQ ID of '1', in some examples. The UE 115-b may continue AUL transmissions 340 (not shown) for the remaining uplink subframes as needed, Time 345 may be associated with the end of the AUL TxOP.

Each AUL transmission 340 may be associated with a HARQ identifier and during time 338 the UE 115-b may determine the HARQ process identifier using the techniques discussed above.

Base station 105-b may initiate a second CCA procedure 350 to determine whether the channel is available for communication. Once it is determined that the channel is available, base station 105-b may then transmit a preamble 355, which may include a reservation signal (e.g., a clear to send (CTS) message) to reserve the medium for UL transmission, e.g., for the period indicated by the arrow. For example, preamble 355 may indicate to UE 115-b that the medium is reserved for a given TxOP.

Based on the preamble 355, base station 105-b may transmit at or around time 358 one or more signals 360 that convey acknowledgement/negative acknowledgement (ACK/NACK) information. For example, signal 360-a may include an ACK indicator for HARQ ID '0' and signal 360-b may include a NACK indicator for HARQ ID '1'. The HARQ information (e.g., HARQ ID/NDI) may be carried in the PDCCH.

Accordingly, the UE 115-b may initiate CCA procedure at 365, and may transmit a busy signal 370 indicating that the channel is reserved. At time 380, the UE 115-b may retransmit the AUL transmission 385 that corresponds to a retransmission of AUL transmission 340-b (e.g., the AUL transmission associated with the NACK indicator). The AUL transmission 385 may have the HARQ ID of '1', e.g., the same HARQ ID as AUL transmission 340-b.

Figure 4:
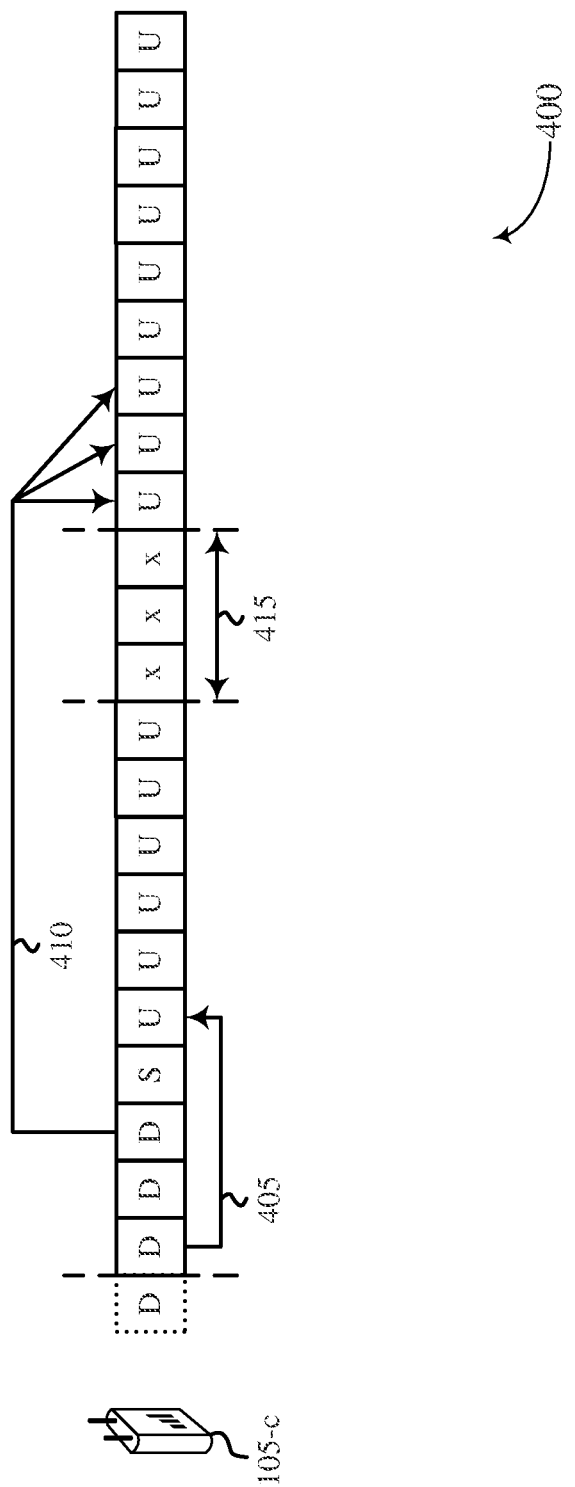
FIG. 4 illustrates an example of a AUL based communications that supports semi-autonomous transmissions in accordance with aspects of the present disclosure.

FIG. 4 illustrates an example of a AUL based communications 400 for semi-autonomous transmissions. AUL based communications 400 may implement one or more aspects of wireless communication system 100 and/or process flow 200 of FIGS. 1 and 2. AUL based communications 400 may illustrate an example of where the semi-static resource allocation is based on an AUL mode using cross-TxOP scheduling. AUL based communications 400 may include communications between a base station 105-c and a UE 115 (not shown), which may be examples of the corresponding devices described herein.

As discussed above, the cross-TxOP scheduling based AUL transmissions may be similar in some aspects with respect to the SPS based AUL transmissions, instead, the cross-TxOP scheduling based AUL transmissions may be based on fixed timing where the DCI includes a periodic pattern and/or TxOP duration or the identity of the subframe(s) is conveyed in the semi-static resource allocation. For example, at 405 the base station 105-c may transmit a uplink grant within the TxOP that includes an n+4 delay constraint. At 410, the base station 105-c may transmit the cross-TxOP uplink grant for subframes (n, n+1, . . . ) or an indication of a periodic pattern. In the example of FIG. 4, the cross-TxOP uplink grant may include a fixed timeline 415 where no AUL transmissions are received and then, after the fixed timeline 415 expires, the UE 115 may autonomously send the AUL transmissions after performing a LBT procedure.

Figure 5:
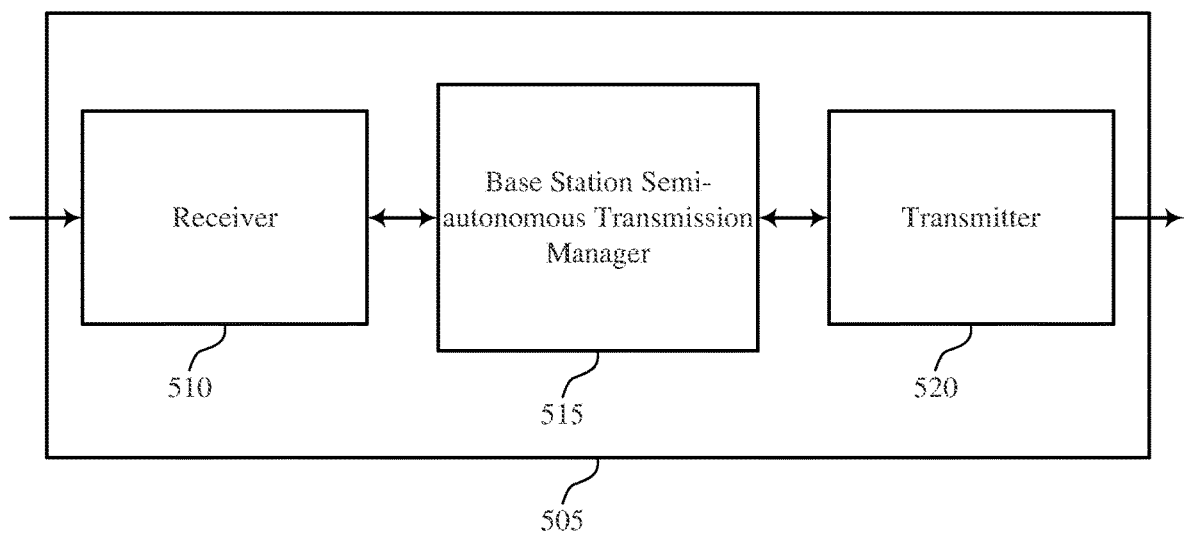
FIGS. 5 through 7 show block diagrams of a device that supports semi-autonomous transmissions in accordance with aspects of the present disclosure.

FIG. 5 shows a block diagram 500 of a wireless device 505 that supports semi-autonomous transmissions in accordance with various aspects of the present disclosure. Wireless device 505 may be an example of aspects of a base station 105 as described with reference to FIG. 1. Wireless device 505 may include a receiver 510, a base station semi-autonomous transmission manager 515, and a transmitter 520, Wireless device 505 may also include a processor. Each of these components may be in communication with one another (e.g., via one or more buses).

Receiver 510 may receive information such as packets, user data, or control information associated with various information channels (e.g., control channels, data channels, and information related to semi-autonomous transmissions, etc.). Information may be passed on to other components of the device. The receiver 510 may be an example of aspects of the transceiver 835 described with reference to FIG. 8.

Base station semi-autonomous transmission manager 515 may be an example of aspects of the base station semi-autonomous transmission manager 815 described with reference to FIG. 8. Base station semi-autonomous transmission manager 515 may identify a resource allocation for a device, the resource allocation being associated with wireless communication in an unlicensed radio frequency spectrum band. Base station semi-autonomous transmission manager 515 may generate a message including an indication of the resource allocation and provide the message for transmission to the device. Base station semi-autonomous transmission manager 515 may provide a means for, or otherwise be an example of, a processing system and/or an interface configured to implement one or more aspects of the described techniques.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8, The transmitter 520 may include a single antenna, or it may include a set of antennas. In some aspects, transmitter 520 may be configured to transmit the message to the device.

Figure 6:
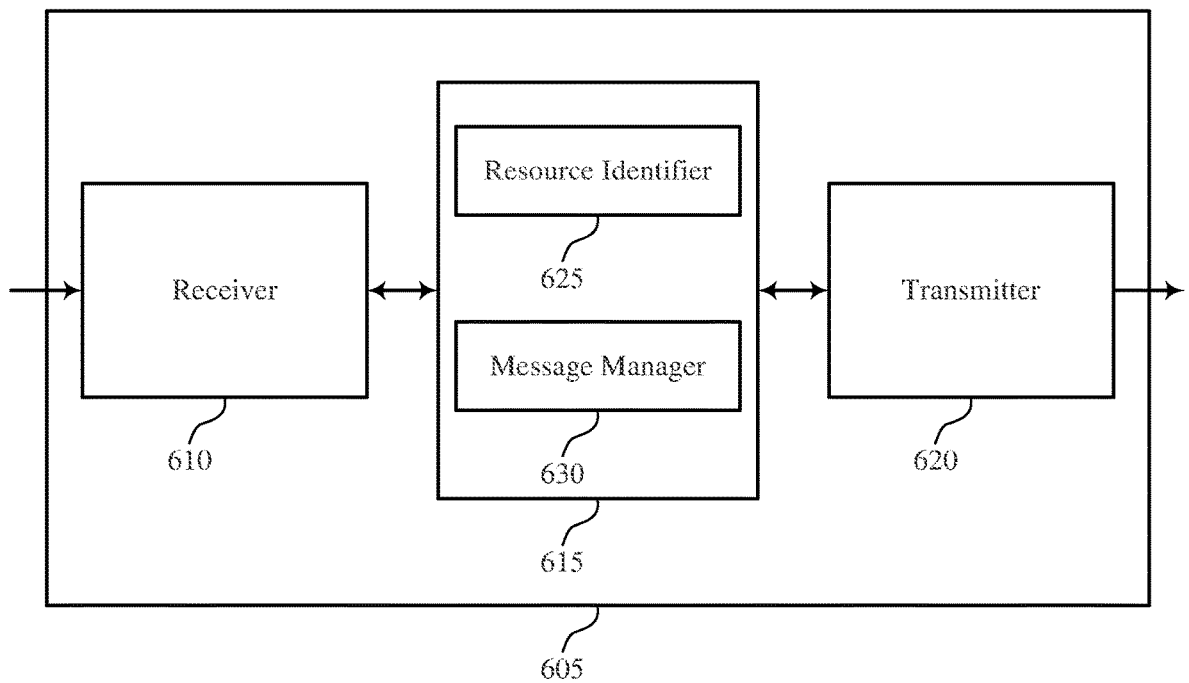

FIG. 6 shows a block diagram 600 of a wireless device 605 that supports semi-autonomous transmissions in accordance with various aspects of the present disclosure. Wireless device 605 may be an example of aspects of a wireless device 505 or a base station 105 as described with reference to FIGS. 1 through 5. Wireless device 605 may include a receiver 610, a base station semi-autonomous transmission manager 615, and a transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to semi-autonomous transmissions, etc.). Information may be passed on to other components of the device. The receiver 610 may be an example of aspects of the transceiver 835 described with reference to FIG. 8.

Base station semi-autonomous transmission manager 615 may be an example of aspects of the base station semi-autonomous transmission manager 815 described with reference to FIG. 8. Base station semi-autonomous transmission manager 615 may also include resource identifier 625 and message manager 630.

Resource identifier 625 may identify a resource allocation for a device, the resource allocation being associated with wireless communication in an unlicensed radio frequency spectrum band. In some cases, the resource allocation includes a semi-static resource allocation. Resource identifier 625 may provide a means for, or otherwise be an example of, a processing system configured to implement one or more aspects of the described techniques.

Message manager 630 may generate a message including an indication of the resource allocation, and provide the message for transmission to the device. Message manager 630 may provide a means for, or otherwise be an example of, an interface configured to implement one or more aspects of the described techniques.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas. In some aspects, transmitter 620 may be configured to transmit the message to the UE.

Figure 7:
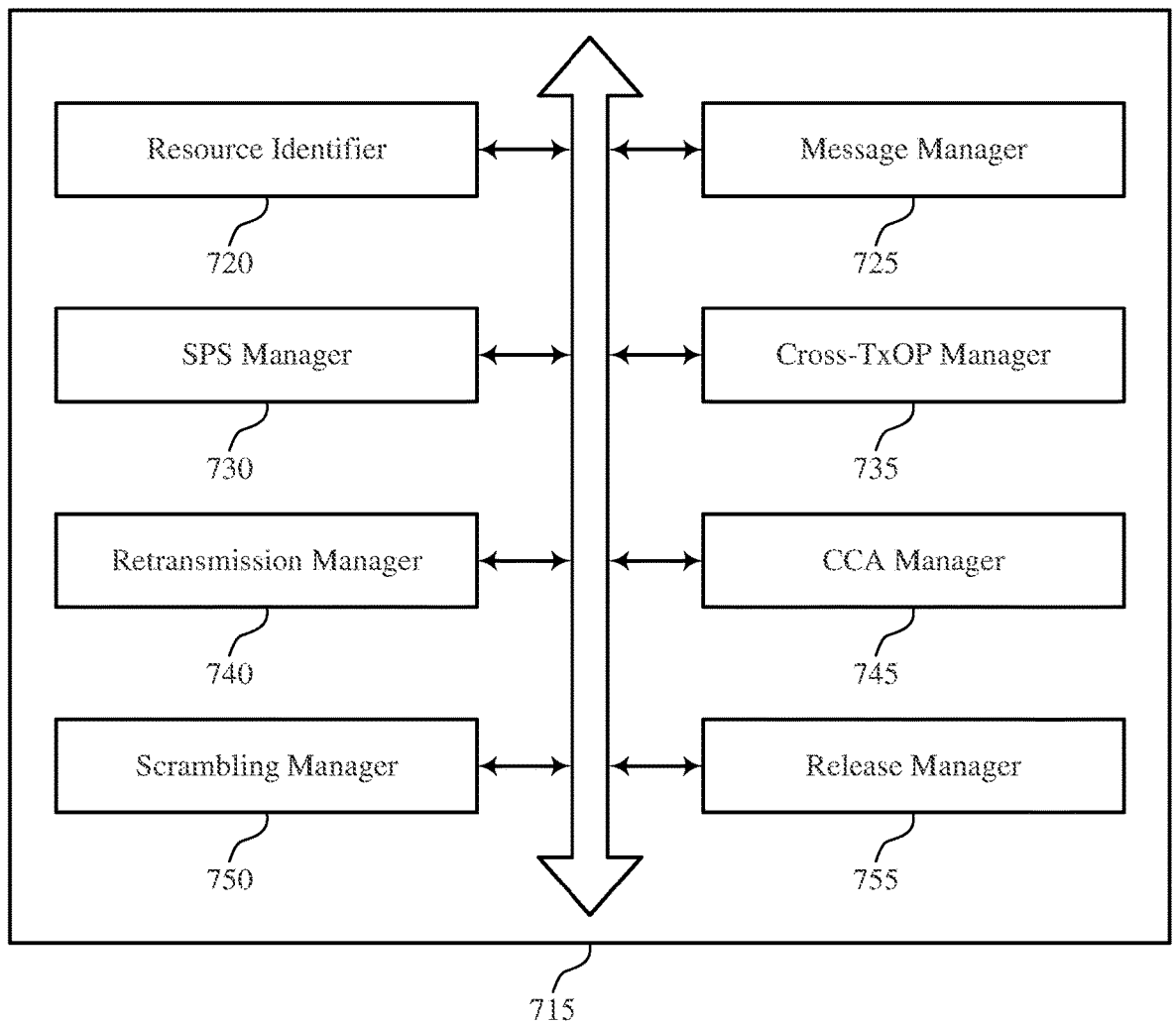

FIG. 7 shows a block diagram 700 of a base station semi-autonomous transmission manager 715 that supports semi-autonomous transmissions in accordance with various aspects of the present disclosure. The base station semi-autonomous transmission manager 715 may be an example of aspects of a base station semi-autonomous transmission manager 515, a base station semi-autonomous transmission manager 615, or a base station semi-autonomous transmission manager 815 described with reference to FIGS. 5, 6, and 8. The base station semi-autonomous transmission manager 715 may include a resource identifier 720, a message manager 725, a SPS manager 730, a cross-TxOP manager 735, a retransmission manager 740, a CCA manager 745, a scrambling manager 750, and a release manager 755. Each of these modules may communicate, directly or indirectly, with one another (e.g., via one or more buses).

The resource identifier 720, the message manager 725, the SPS manager 730, the cross-TxOP manager 735, the retransmission manager 740, the CCA manager 745, the scrambling manager 750, and/or the release manager 755 may provide a means for or be an example of a processing system and/or an interface configured to implement one or more aspects of the described techniques.

Resource identifier 720 may identify a resource allocation for a device, the resource allocation being associated with wireless communication in an unlicensed radio frequency spectrum band. In some cases, the resource allocation includes a semi-static resource allocation.

Message manager 725 may generate a message including an indication of the resource allocation, provide the message for transmission to the device, and provide the second message for transmission to the device.

SPS manager 730 may manage one or more aspects of an AUL mode and SPS. In some cases, the message includes a RRC message including a field in which the indication is conveyed. In some cases, the field includes information associated with an autonomous transmission mode and SPS to be used by the method and the device. In some cases, the resource allocation includes a duration of an uplink TxOP associated with the wireless communication. In some cases, the resource allocation includes a periodic schedule for transmission of one or more subframes by the device. In some cases, the resource allocation includes a frequency domain allocation for transmission of one or more subframes by the device. In some cases, the frequency domain allocation is associated with one or more frequencies to be used by the device for frequency hopping.

Cross-TxOP manager 735 may provide the DCI via a PDCCH. In some cases, the message indicates a cross-TxOP to be used by an apparatus and the device. In some cases, the indication includes at least one of a periodicity parameter, a scheduling parameter, or a duration of a TxOP associated with the wireless communication. In some cases, the cross-TxOP uplink grant includes scheduling parameters identifying one or more time periods for transmission by the device.

Retransmission manager 740 may identify, based on the message, a retransmission parameter, where the retransmission parameter includes at least one of a value associated with a number of configured HARQ processes, a retransmission identifier, or a sequential retransmission identifier. Retransmission manager 740 may obtain a retransmission of the wireless communication according to a retransmission scheme. Retransmission manager 740 may calculate, based on a temporal parameter associated with the wireless communication and a HARQ process count value, a retransmission identifier, and obtain the retransmission of the autonomous transmission based on the calculated retransmission identifier. In some cases, the retransmission scheme includes an asynchronous HARQ.

CCA manager 745 may obtain a result of a channel access procedure prior to providing the message. In some cases, the channel access procedure includes a full CCA procedure.

Scrambling manager 750 may scramble DCI of the message using a SPS RNTI, where the message provided for transmission to the device includes the scrambled DCI. Scrambling manager 750 may scramble the indicator releasing the resource allocation using a SPS RNTI, where the second message provided for transmission to the device includes the scrambled indicator releasing the resource allocation.

Release manager 755 may generate a second message, where the second message includes an indicator releasing the resource allocation.

Figure 8:
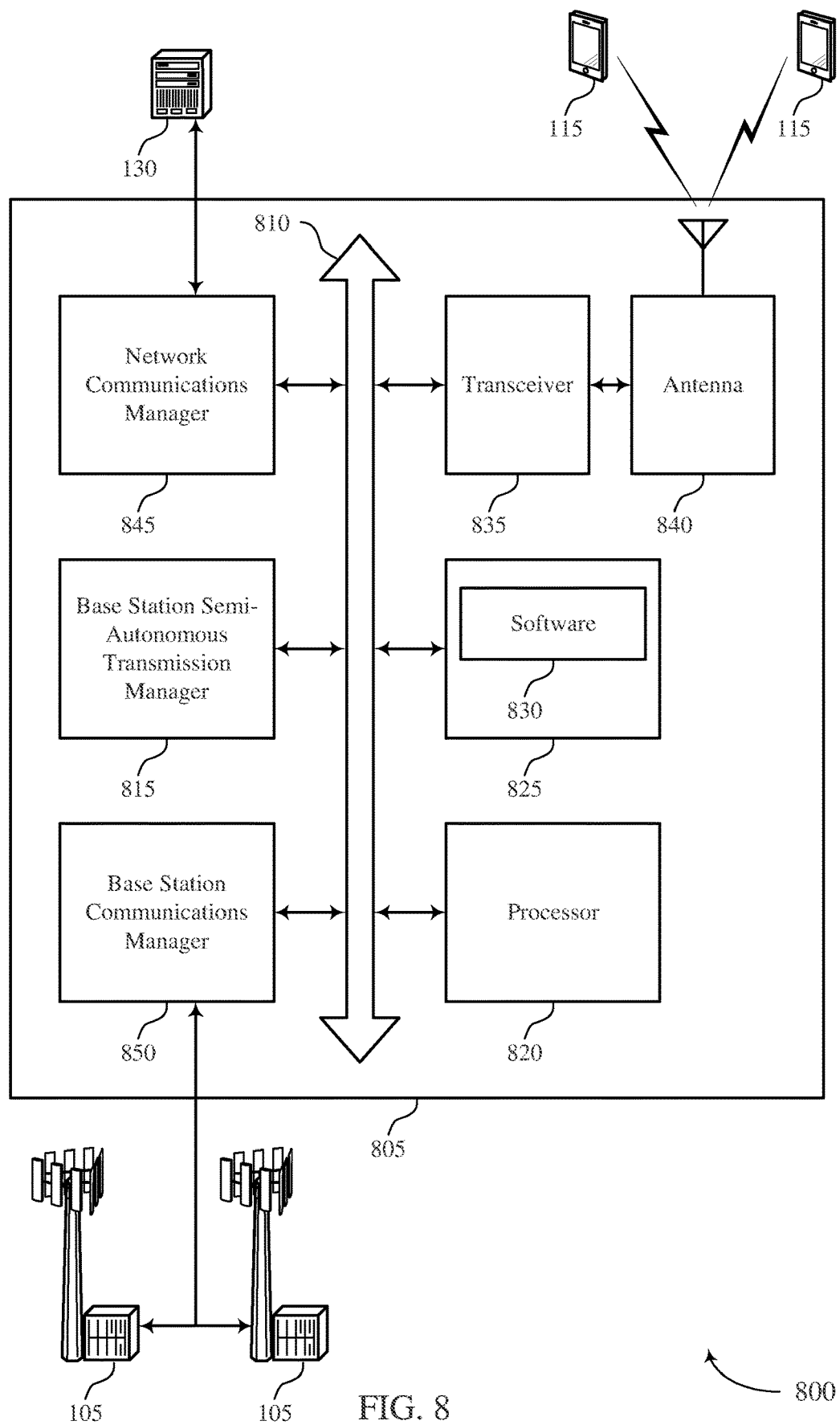
FIG. 8 illustrates a Hock diagram of a system including a base station that supports semi-autonomous transmissions in accordance with aspects of the present disclosure.

FIG. 8 shows a diagram of a system 800 including a device 805 that supports semi-autonomous transmissions in accordance with various aspects of the present disclosure. Device 805 may be an example of or include the components of wireless device 505, wireless device 605, or a base station 105 as described above, e.g., with reference to FIGS. 1 through 6. Device 805 may include components for bi-directional voice and data communications including components for transmitting and receiving communications, including a base station semi-autonomous transmission manager 815, a processor 820, a memory 825, a software 830, a transceiver 835, an antenna 840, a network communications manager 845, and a base station communications manager 850. These components may be in electronic communication via one or more busses (e.g., bus 810). Device 805 may communicate wirelessly with one or more user equipment (UE)s 115. Device 805, or one or more components of device 805, may provide a means for or be an example of a processing system and/or an interface configured to implement one or more aspects of the described techniques.

Processor 820 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting semi-autonomous transmissions).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support semi-autonomous transmissions. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate hi-directionally with another wireless transceiver. The transceiver 835 may also include a modem to modulate the packets and provide the modulated packets to the antennas for transmission, and to demodulate packets received from the antennas. In some aspects, transceiver 835 may be configured to transmit the message to the device, such as a UE.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Base station communications manager 850 may manage communications with other base station 105, and may include a controller or scheduler for controlling communications with UEs 115 in cooperation with other base stations 105. For example, the base station communications manager 850 may coordinate scheduling for transmissions to UEs 115 for various interference mitigation techniques such as beamforming or joint transmission. In some examples, base station communications manager 850 may provide an X2 interface within an Long Term Evolution (LTE)/LTE-A wireless communication network technology to provide communication between base stations 105.

Base station semi-autonomous transmission manager 815 may be an example of and/or implement one or more aspects of base station semi-autonomous transmission manages 515, 615, and/or 715 of FIGS. 5 through 7.

The base station semi-autonomous transmission manager 815, processor 820, memory 825, software 830, transceiver 835, antenna 840, network communications manager 845, and base station communications manager 850 may be means for identifying a resource allocation for a device, the resource allocation being associated with wireless communication in an unlicensed radio frequency spectrum band. In some aspects, the resource allocation may include a semi-static resource allocation. In some aspects, the resource allocation may include a duration of an uplink MOP associated with the wireless communication. In some aspects, the resource allocation may include a periodic schedule for transmission of one or more subframes by the device. In some aspects, the resource allocation may include a frequency domain allocation for transmission of one or more subframes by the device. In some aspects, the frequency domain allocation may be associated with one or more frequencies to be used by the device for frequency hopping.

The base station semi-autonomous transmission manager 815, processor 820, memory 825, software 830, transceiver 835, antenna 840, network communications manager 845, and base station communications manager 850 may be means for generating a message comprising an indication of the resource allocation. In some aspects, the message may include a RRC message that comprises a field in which the indication is conveyed. In some aspects, the field may include information associated with an autonomous transmission mode and SPS to be used by an apparatus and the device. In some aspects, the message indicates a cross-TxOP to be used by an apparatus and the device.

The base station semi-autonomous transmission manager 815, processor 820, memory 825, software 830, transceiver 835, antenna 840, network communications manager 845, and base station communications manager 850 may be means for providing the message for transmission to the device.

The base station semi-autonomous transmission manager 815, processor 8200 memory 825, software 830, transceiver 835, antenna 840, network communications manager 845, and base station communications manager 850 may be means for providing the DCI via a PDCCH. In some aspects, the indication may include at least one of a periodicity parameter, a scheduling parameter, or a duration of a cross-TxOP associated with the wireless communication in some aspects, the cross-TxOP uplink grant may include scheduling parameters identifying one or more time periods for transmission by the device.

The base station semi-autonomous transmission manager 815, processor 820, memory 825, software 830, transceiver 835, antenna 840, network communications manager 845, and base station communications manager 850 may be means for identifying, based at least in part on the message, a retransmission parameter, wherein the retransmission parameter comprises at least one of a value associated with a number of configured HARQ processes, a retransmission identifier, or a sequential retransmission identifier.

The base station semi-autonomous transmission manager 815, processor 820, memory 825, software 830, transceiver 835, antenna 840, network communications manager 845, and base station communications manager 850 may be means for obtaining a result of a channel access procedure prior to providing the message. In some aspects, the channel access procedure comprises a full CCA procedure.

The base station semi-autonomous transmission manager 815, processor 820, memory 825, software 830, transceiver 835, antenna 840, network communications manager 845, and base station communications manager 850 may be means for scrambling DCI of the message using a SPS RNTI, wherein the message provided for transmission to the device comprises the scrambled DCI.

The base station semi-autonomous transmission manager 815, processor 820, memory 825, software 830, transceiver 835, antenna 840, network communications manager 845, and base station communications manager 850 may be means for generating a second message, wherein the second message comprises an indicator releasing the resource allocation.

The base station semi-autonomous transmission manager 815, processor 820, memory 825, software 830, transceiver 835, antenna 840, network communications manager 845, and base station communications manager 850 may be means for providing the second message for transmission to the device.

The base station semi-autonomous transmission manager 815, processor 820, memory 825, software 830, transceiver 835, antenna 840, network communications manager 845, and base station communications manager 850 may be means for scrambling the indicator releasing the resource allocation using the SPS RNTI, wherein the second message provided for transmission to the device comprises the scrambled indicator releasing the resource allocation.

The base station semi-autonomous transmission manager 815, processor 820, memory 825, software 830, transceiver 835, antenna 840, network communications manager 845, and base station communications manager 850 may be means for obtaining a retransmission of the wireless communication according to a retransmission scheme. In some aspects, the retransmission scheme comprises an asynchronous HARQ.

The base station semi-autonomous transmission manager 815, processor 820, memory 825, software 830, transceiver 835, antenna 840, network communications manager 845, and base station communications manager 850 may be means for calculating, based at least in part on a temporal parameter associated with the wireless communication and a HARQ process count value, a retransmission identifier.

The base station semi-autonomous transmission manager 815, processor 820, memory 825, software 830, transceiver 835, antenna 840, network communications manager 845, and base station communications manager 850 may be means for obtaining the retransmission of the autonomous transmission based at least in part on the calculated retransmission identifier.

Figure 9:
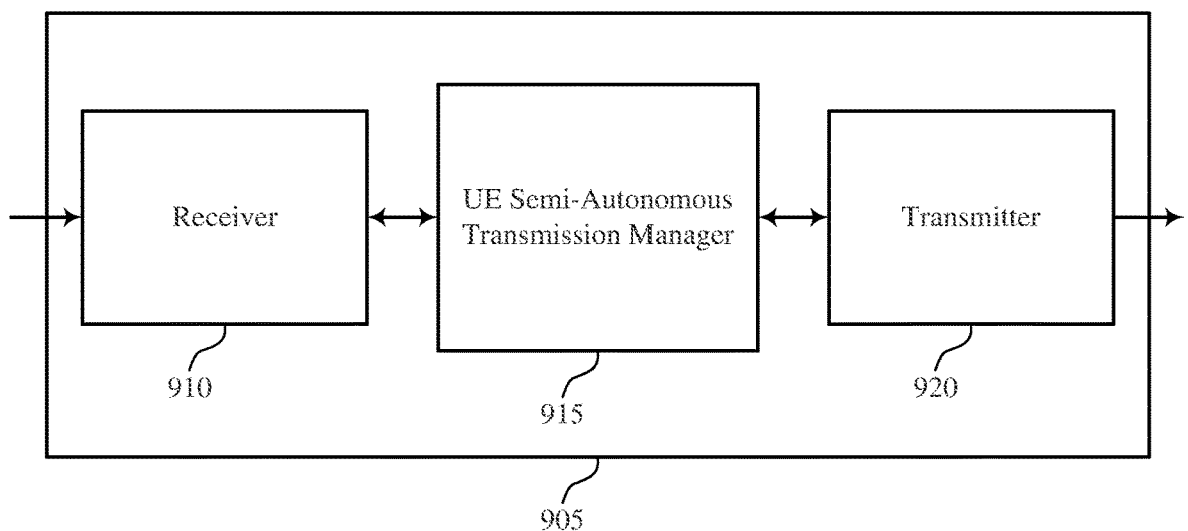
FIGS. 9 through 11 show block diagrams of a device that supports se autonomous transmissions in accordance with aspects of the present disclosure.

FIG. 9 shows a block diagram 900 of a wireless device 905 that supports semi-autonomous transmissions in accordance with various aspects of the present disclosure. Wireless device 905 may be an example of aspects of a UE 115 as described with reference to FIGS. 1 through 4. Wireless device 905 may include a receiver 910, a UE semi-autonomous transmission manager 915, and a transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to semi-autonomous transmissions, etc.). Information may be passed on to other components of the device. The receiver 910 may be an example of aspects of the transceiver 1235 described with reference to FIG. 12. Receiver 910 may provide a means for or be an example of an interface configured to implement one or more aspects of the described techniques. In some aspects, receiver 910 may be configured to obtain the message from a device, the message conveying the indication of the resource allocation.

UE semi-autonomous transmission manager 915 may be an example of aspects of the UE semi-autonomous transmission manager 1215 described with reference to FIG. 12.

UE semi-autonomous transmission manager 915 may obtain a message from a device, the message conveying an indication of a resource allocation. UE semi-autonomous transmission manager 915 may identify, based on the resource allocation, a transmission schedule for wireless communication in an unlicensed radio frequency spectrum band and provide the information for transmission according to the transmission schedule. UE semi-autonomous transmission manager 915 may provide a means for or be an example of a processing system and/or an interface configured to implement one or more aspects of the described techniques.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas. Transmitter 920 may provide a means for or be an example of an interface configured to implement one or more aspects of the described techniques. In some aspects, transmitter 920 may be configured to transmit the information according to the transmission schedule.

Figure 10:
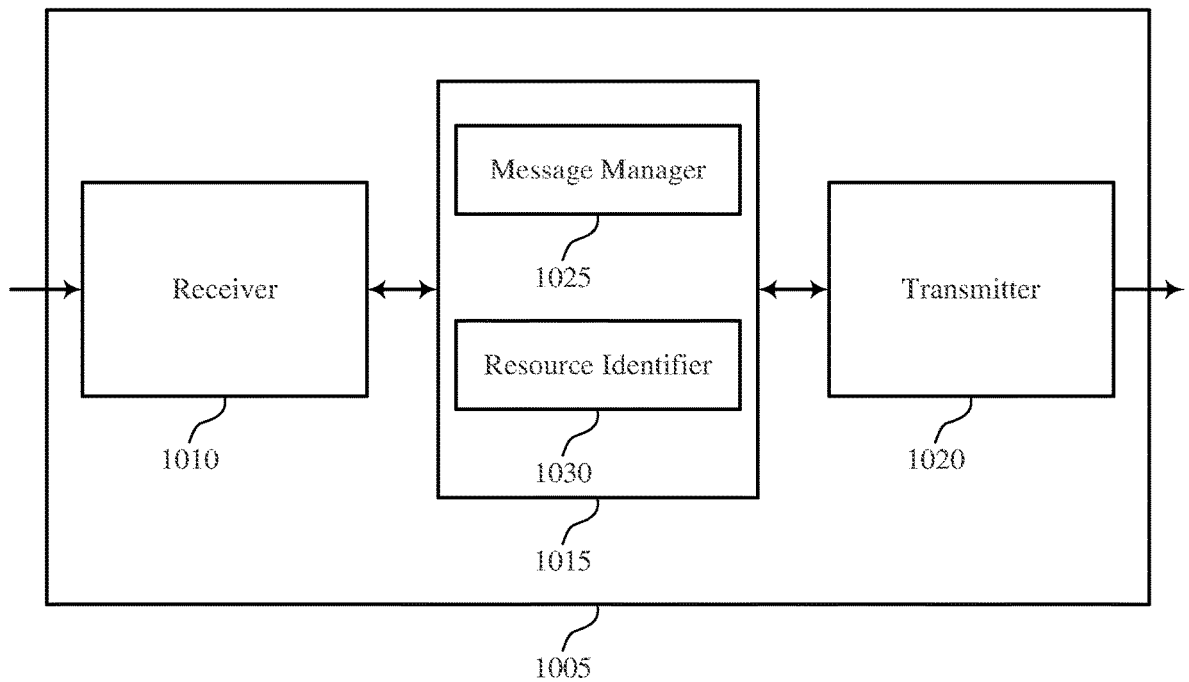

FIG. 10 shows a block diagram 1000 of a wireless device 1005 that supports semi-autonomous transmissions in accordance with various aspects of the present disclosure. Wireless device 1005 may be an example of aspects of a wireless device 905 or a UE 115 as described with reference to FIGS. 1 through 4 and 9. Wireless device 1005 may include a receiver 1010, a UE semi-autonomous transmission manager 1015, and a transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to semi-autonomous transmissions, etc.). Information may be passed on to other components of the device. The receiver 1010 may be an example of aspects of the transceiver 1235 described with reference to FIG. 12. Receiver 1010 may provide a means for or be an example of an interface configured to implement one or more aspects of the described techniques. In some aspects, receiver 1010 may be configured to obtain (or receive) a message from a device, the message conveying an indication of the resource allocation.

UE semi-autonomous transmission manager 1015 may be an example of aspects of the UE semi-autonomous transmission manager 1215 described with reference to FIG. 12.

UE semi-autonomous transmission manager 1015 may also include message manager 1025 and resource identifier 1030.

Message manager 1025 may obtain a message from a device, the message conveying an indication of a resource allocation. Message manager 1025 may provide the information for transmission according to the transmission schedule. Message manager 1025 may provide a means for or be an example of an interface configured to implement one or more aspects of the described techniques.

Resource identifier 1030 may identify, based on the resource allocation, a transmission schedule for wireless communication in an unlicensed radio frequency spectrum band. Resource identifier 1030 may provide a means for or be an example of a processing system configured to implement one or more aspects of the described techniques.

Transmitter 1020 may transmit signals generated by other components of the device. In some examples, the transmitter 1020 may be collocated with a receiver 1010 in a transceiver module. For example, the transmitter 1020 may be art example of aspects of the transceiver 1235 described with reference to FIG. 12. The transmitter 1020 may include a single antenna, or it may include a set of antennas. Transmitter 1020 may provide a means for or be an example of an interface configured to implement one or more aspects of the described techniques. In some aspects, transmitter 1020 may be configured to transmit information according to the transmission schedule.

Figure 11:
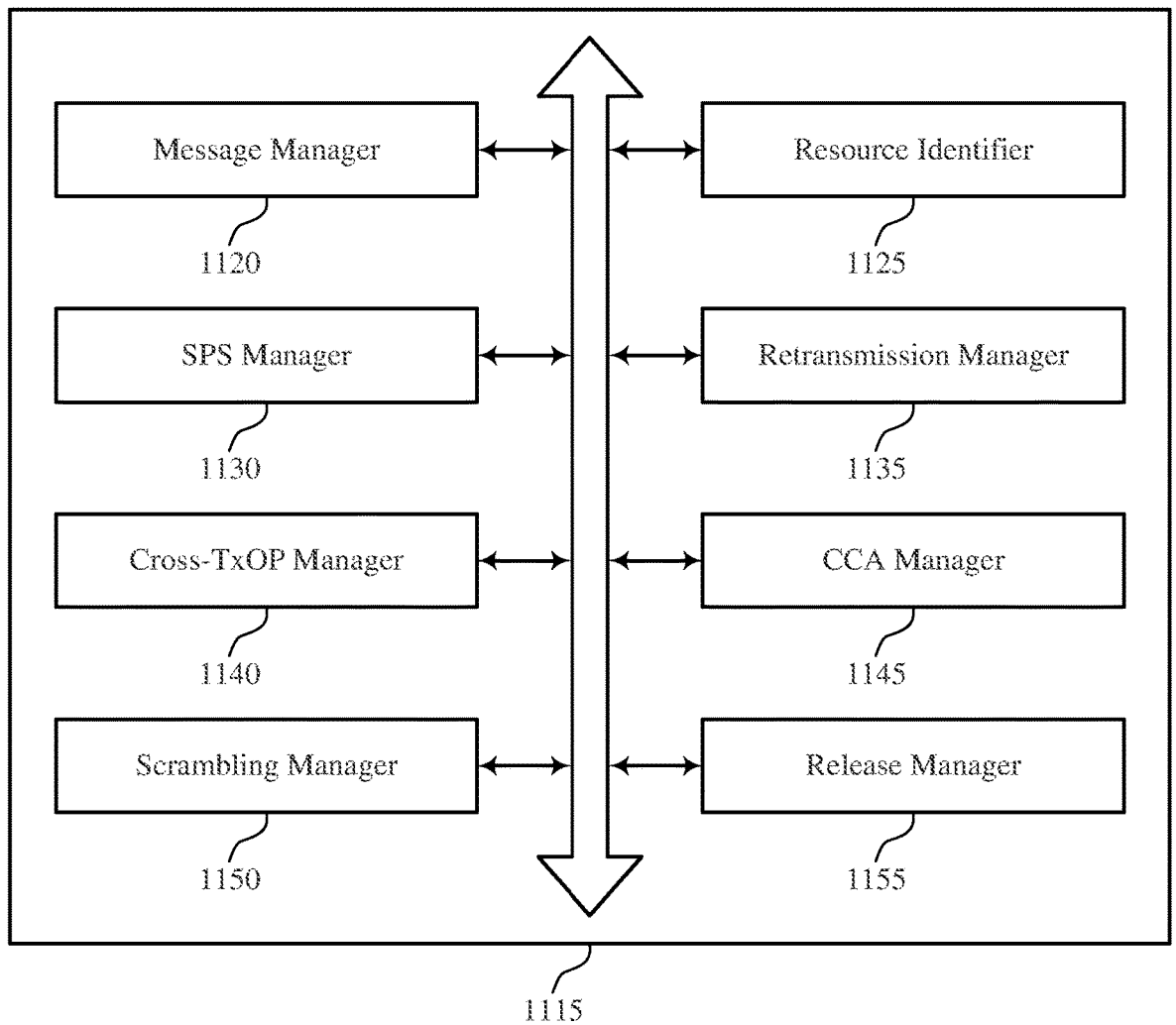

FIG. 11 shows a block diagram 1100 of a UE semi-autonomous transmission manager 1115 that supports semi-autonomous transmissions in accordance with various aspects of the present disclosure. The UE semi-autonomous transmission manager 1115 may be an example of aspects of a UE semi-autonomous transmission manager 915, 1015, and 1215 described with reference to FIGS. 9, 10, and 12. The UE semi-autonomous transmission manager 1115 may include a message manager 1120, a resource identifier 1125, a SPS manager 1130, a retransmission manager 1135, a cross-TxOP manager 1140, a CCA manager 1145, a scrambling manager 1150, and a release manager 1155. Each of these modules may communicate, directly or indirectly, with one another (e.g., via one or more buses).

The message manager 1120, the resource identifier 1125, the SPS manager 1130, the retransmission manager 1135, the cross-TxOP manager 1140, the CCA manager 1145, the scrambling manager 1150, and/or the release manager 1155 may provide a means for or be examples of a processing system and/or an interface configured to implement one or more aspects of the described techniques.

Message manager 1120 may obtain a message from a device, the message conveying an indication of a resource allocation. Message manager 1120 may provide the information for transmission according to the transmission schedule. Message manager 1120 may obtain the resource allocation based on a descrambled DCI.

Resource identifier 1125 may identify, based on the resource allocation, a transmission schedule for wireless communication in an unlicensed radio frequency spectrum band.

SPS manager 1130 may identify a semi-static configuration of the transmission schedule based on a semi-static parameter of the resource allocation, where the information is provided for transmission according to the identified semi-static configuration. SPS manager 1130 may identify, based on the resource allocation, a duration of an uplink transmission opportunity (TxOP) of the transmission schedule, where the information is provided for transmission during the duration of the uplink TxOP SPS manager 1130 may select, based on the resource allocation, an autonomous transmission mode and SPS for transmission of the information according to the transmission schedule, where the information is provided for transmission using the selected autonomous transmission mode and the SPS. SPS manager 1130 may select, based on the resource allocation, a periodicity of the transmission schedule, where the information is provided for transmission according to the selected periodicity of the transmission schedule. SPS manager 1130 may and select, based on the resource allocation, a frequency hopping scheme for transmission of the information according to the transmission schedule, where the information is provided for transmission using the selected frequency hopping scheme.

Retransmission manager 1135 may select, based on the resource allocation, a retransmission scheme for retransmission of the information. In some aspects, the information is provided for transmission via the selected one or more frequencies, Retransmission manager 1135 may select, based on the resource allocation, a retransmission scheme for retransmission of the information, and provide the retransmission of the at least a portion of the information according to the selected retransmission scheme. In some cases, the retransmission scheme includes an asynchronous HARQ scheme.

Cross-TxOP manager 1140 may select, based on the resource allocation, a cross-TxOP for transmission of the information according to the transmission schedule, where the information is provided for transmission during the selected cross-TxOP.

CCA manager 1145 may obtain a result of a channel access procedure prior to providing the information for transmission. In some cases, the channel access procedure includes at least one of a full CCA procedure, a one-shot CCA procedure, or a short CCA procedure. Scrambling manager 1150 may descramble DCI of the message using a SPS RNTI.

Release manager 1155 may obtain a second message from the device, where the second message includes an indicator releasing the resource allocation. Release manager 1155 may modify the transmission schedule based on the indicator releasing the resource allocation. Release manager 1155 may stop providing the information for transmission based on the modified transmission schedule.

Figure 12:
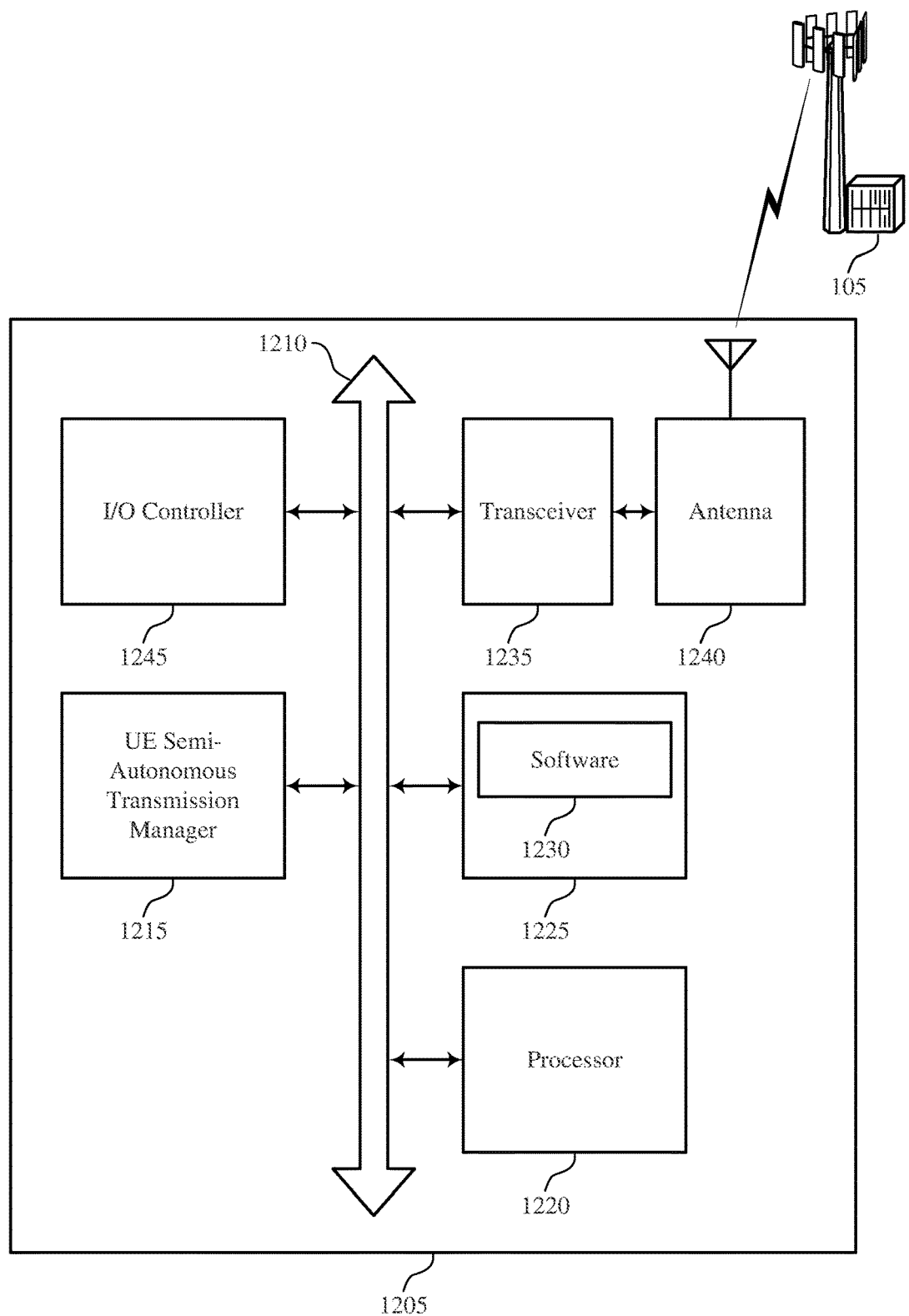
FIG. 12 illustrates a block diagram of a system including a UE that supports semi-autonomous transmissions in accordance with aspects of the present disclosure.

FIG. 12 shows a diagram of a system 1200 including a device 1205 that supports semi-autonomous transmissions in accordance with various aspects of the present disclosure. Device 1205 may be an example of or include the components of UE 115 as described above, e.g., with reference to FIGS. 1 through 4. Device 1205 may include components for bi-directional voice and data communications including components for transmitting and receiving communications, including a UE semi-autonomous transmission manager 1215, a processor 1220, a memory 1225, a software 1230, a transceiver 1235, an antenna 1240, and an I/O controller 1245. These components may be in electronic communication via one or more busses (e.g., bus 1210). Device 1205 may communicate wirelessly with one or more base stations 105. Device 1205, or component(s) of device 1205, may provide a means for or be examples of a processing system and/or an interface configured to implement one or more aspects of the described techniques.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting semi-autonomous transmissions).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support semi-autonomous transmissions. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some aspects, transceiver 1235 may be configured to obtain a message from a device, the message conveying an indication of the resource allocation. In some aspects, transceiver 1235 may be configured to transmit information according to the transmission schedule.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system.

The UE semi-autonomous transmission manager 1215, processor 1220, memory 1225, software 1230, transceiver 1235, antenna 1240, and I/O controller 1245 may be means for obtaining a message from a device, the message conveying an indication of a resource allocation.

The UE semi-autonomous transmission manager 1215, processor 1220, memory 1225, software 1230, transceiver 1235, antenna 1240, and I/O controller 1245 may be means for identifying, based at least in part on the resource allocation, a transmission schedule for wireless communication in an unlicensed radio frequency spectrum band.

The UE semi-autonomous transmission manager 1215, processor 1220, memory 1225, software 1230, transceiver 1235, antenna 1240, and I/O controller 1245 may be means for providing the information for transmission according to the transmission schedule.

The UE semi-autonomous transmission manager 1215, processor 1220, memory 1225, software 1230, transceiver 1235, antenna 1240, and I/O controller 1245 may be means for identifying a semi-static configuration of the transmission schedule based at least in part on a semi-static parameter of the resource allocation, wherein the information is provided for transmission according to the identified semi-static configuration.

The UE semi-autonomous transmission manager 1215, processor 1220, memory 1225, software 1230, transceiver 1235, antenna 1240, and I/O controller 1245 may be means for identifying, based at least in part on the resource allocation, a duration of an uplink TAP of the transmission schedule, wherein the information is provided for transmission during the duration of the uplink TxOP.

The UE semi-autonomous transmission manager 1215, processor 1220, memory 1225, software 1230, transceiver 1235, antenna 1240, and I/O controller 1245 may be means for selecting, based at least in part on the resource allocation, an autonomous transmission mode and SPS for transmission of the information according to the transmission schedule, wherein the information is provided for transmission using the selected autonomous transmission mode and the SPS.

The UE semi-autonomous transmission manager 1215, processor 1220, memory 1225, software 1230, transceiver 1235, antenna 1240, and I/O controller 1245 may be means for selecting, based at least in part on the resource allocation, a periodicity of the transmission schedule, wherein the information is provided for transmission according to the selected periodicity of the transmission schedule.

The UE semi-autonomous transmission manager 1215, processor 1220, memory 1225, software 1230, transceiver 1235, antenna 1240, and I/O controller 1245 may be means for selecting, based at least in part on the resource allocation, a retransmission scheme for retransmission of the information, wherein the information is provided for transmission for transmission via the selected one or more frequencies.

The UE semi-autonomous transmission manager 1215, processor 1220, memory 1225, software 1230, transceiver 1235, antenna 1240, and I/O controller 1245 may be means for selecting, based at least in part on the resource allocation, a frequency hopping scheme for transmission of the information according to the transmission schedule, wherein the information is provided for transmission using the selected frequency hopping scheme.

The UE semi-autonomous transmission manager 1215, processor 1220, memory 1225, software 1230, transceiver 1235, antenna 1240, and I/O controller 1245 may be means for selecting, based at least in part on the resource allocation, a cross-TAP for transmission of the information according to the transmission schedule, wherein the information is provided for transmission during the selected cross-TxOP.

The UE semi-autonomous transmission manager 1215, processor 1220, memory 1225, software 1230, transceiver 1235, antenna 1240, and I/O controller 1245 may be means for selecting, based at least in part on the resource allocation, a retransmission scheme for retransmission of the information.

The UE semi-autonomous transmission manager 1215, processor 1220, memory 1225, software 1230, transceiver 1235, antenna 1240, and I/O controller 1245 may be means for providing the retransmission of the at least a portion of the information according to the selected retransmission scheme. In some aspects, the retransmission scheme comprises an asynchronous HARQ scheme.

The UE semi-autonomous transmission manager 1215, processor 1220, memory 1225, software 1230, transceiver 1235, antenna 1240, and I/O controller 1245 may be means for obtaining a result of a channel access procedure prior to providing the information for transmission. In some aspects, the channel access procedure comprises at least one of a full CCA procedure, a one-shot CCA procedure, or a short CCA procedure.

The UE semi-autonomous transmission manager 1215, processor 1220, memory 1225, software 1230, transceiver 1235, antenna 1240, and I/O controller 1245 may be means for descrambling downlink control information (DCI) of the message using a SPS The UE semi-autonomous transmission manager 1215, processor 1220, memory 1225, software 1230, transceiver 1235, antenna 1240, and I/O controller 1245 may be means for obtaining the resource allocation based at least in part on the descrambled DCI.

The UE semi-autonomous transmission manager 1215, processor 1220, memory 1225, software 1230, transceiver 1235, antenna 1240, and I/O controller 1245 may be means for obtaining a second message from the device, wherein the second message comprises an indicator releasing the resource allocation.

The UE semi-autonomous transmission manager 1215, processor 1220, memory 1225, software 1230, transceiver 1235, antenna 1240, and I/O controller 1245 may be means for modifying the transmission schedule based at least in part on the indicator releasing the resource allocation.

The UE semi-autonomous transmission manager 1215, processor 1220, memory 1225, software 1230, transceiver 1235, antenna 1240, and I/O controller 1245 may be means for stopping providing the information for transmission based at least in part on the modified transmission schedule.

Figure 13:
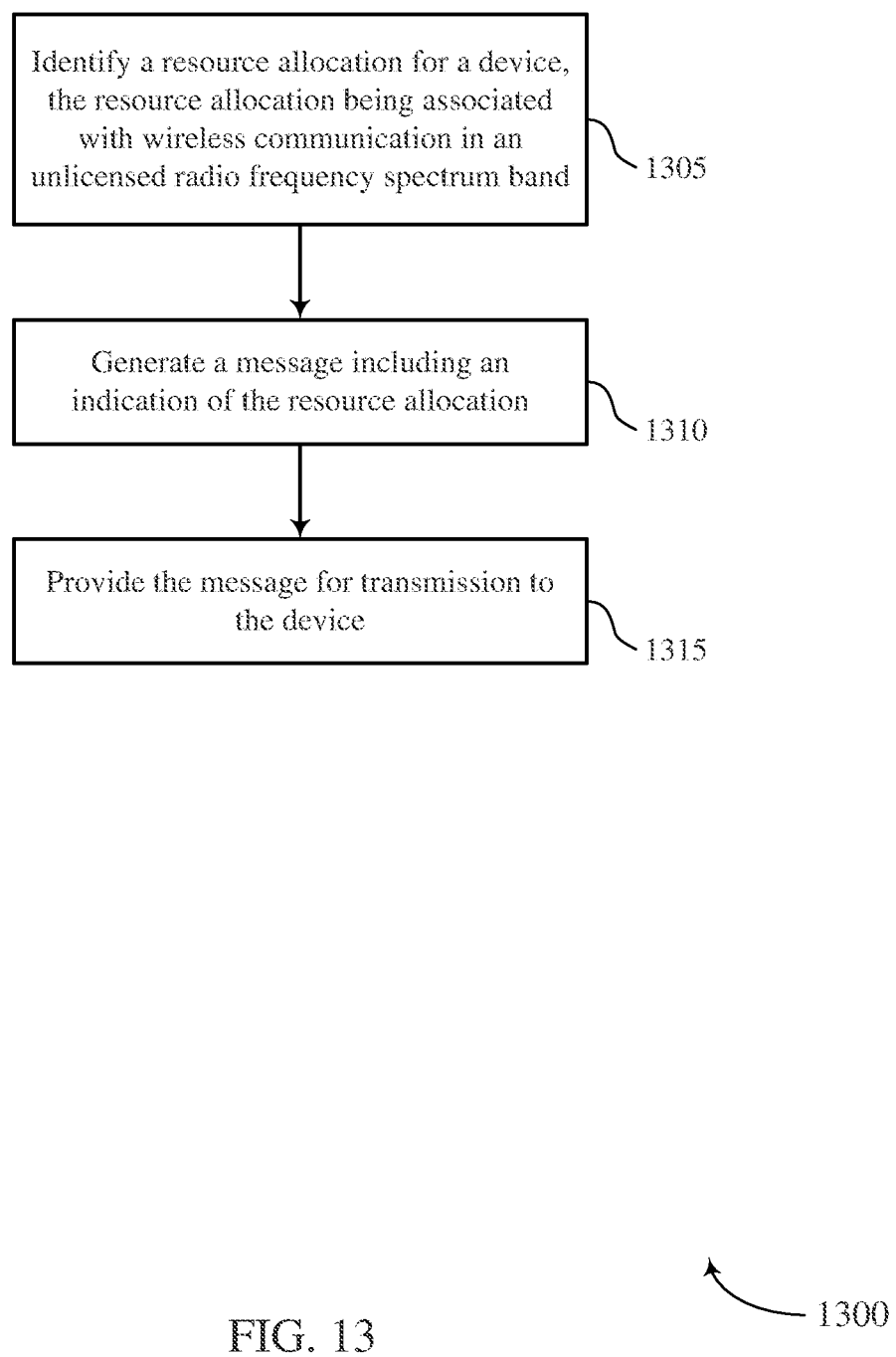
FIGS. 13 through 16 illustrate methods for semi-autonomous transmissions in accordance with aspects of the present disclosure.

FIG. 13 shows a flowchart illustrating a method 1300 for semi-autonomous transmissions in accordance with various aspects of the present disclosure. The operations of method 1300 may be implemented by a base station 105 or its components as described herein. For example, the operations of method 1300 may be performed by a base station semi-autonomous transmission manager as described with reference to FIGS. 5 through 8. In some examples, a base station 105 may execute a set of codes to control the functional elements of the device to perform the functions described below. Additionally or alternatively, the base station 105 may perform aspects the functions described below using special-purpose hardware.

At block 1305 the base station 105 may identity a resource allocation for a device, the resource allocation being associated with wireless communication in an unlicensed radio frequency spectrum band. The operations of block 1305 may be performed according to the methods described with reference to FIGS. 1 through 4. In certain examples, aspects of the operations of block 1305 may be performed by a resource identifier as described with reference to FIGS. 5 through 8.

At block 1310 the base station 105 may generate a message comprising an indication of the resource allocation. The operations of block 1310 may be performed according to the methods described with reference to FIGS. 1 through 4. In certain examples, aspects of the operations of block 1310 may be performed by a message manager as described with reference to FIGS. 5 through 8.

At block 1315 the base station 105 may provide the message for transmission to the device. The operations of block 1315 may be performed according to the methods described with reference to FIGS. 1 through 4. In certain examples, aspects of the operations of block 1315 may be performed by a message manager as described with reference to FIGS. 5 through 8.

Figure 14:
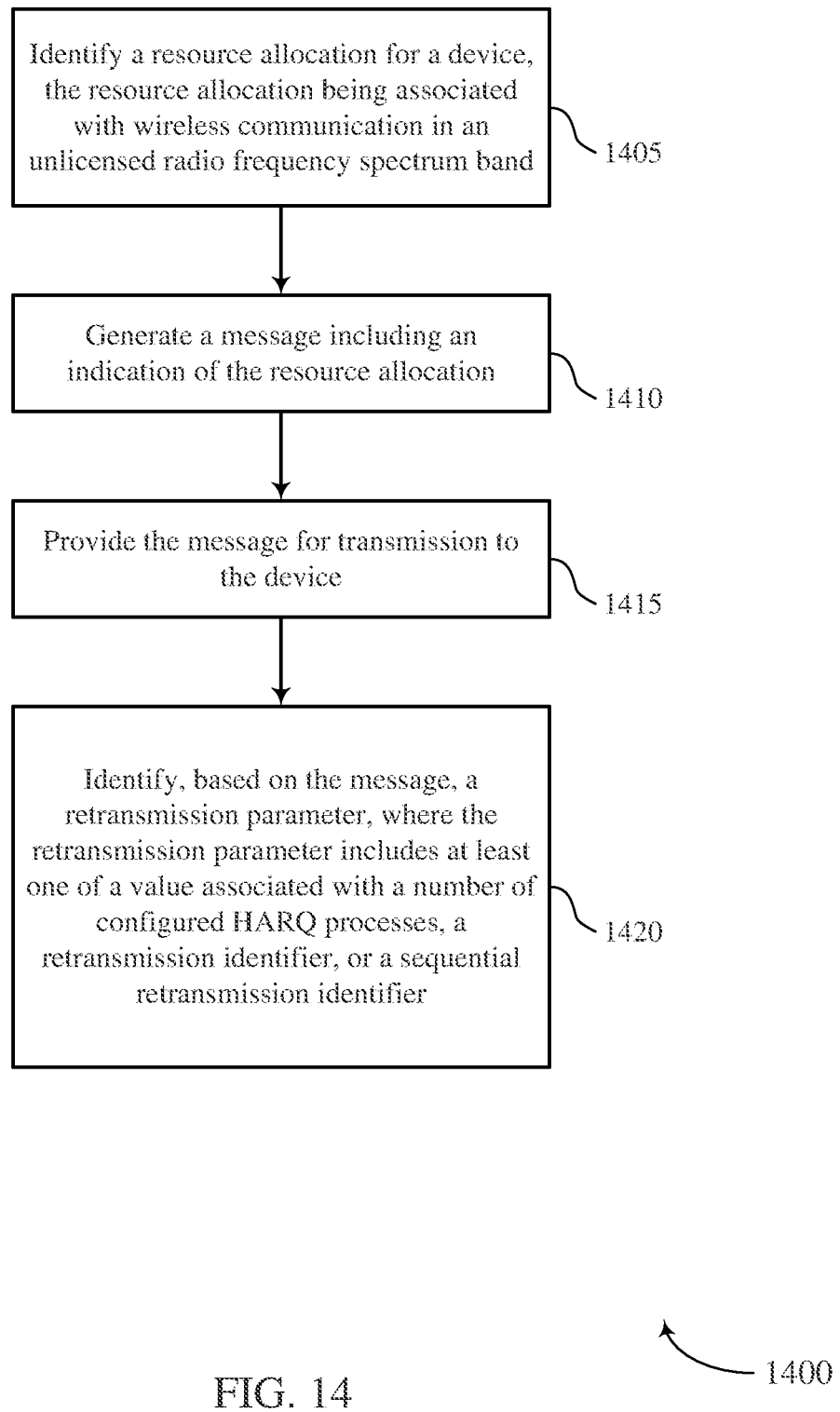

FIG. 14 shows a flowchart Illustrating a method 1400 for semi-autonomous transmissions in accordance with various aspects of the present disclosure. The operations of method 1400 may be implemented by a base station 105 or its components as described herein. For example, the operations of method 1400 may be performed by a base station semi-autonomous transmission manager as described with reference to FIGS. 5 through 8. In some examples, a base station 105 may execute a set of codes to control the functional elements of the device to perform the functions described below. Additionally or alternatively, the base station 105 may perform aspects the functions described below using special-purpose hardware.

At block 1405 the base station 105 may identify a resource allocation for a device, the resource allocation being associated with wireless communication in an unlicensed radio frequency spectrum hand. The operations of block 1405 may be performed according to the methods described with reference to FIGS. 1 through 4. In certain examples, aspects of the operations of block 1405 may be performed by a resource identifier as described with reference to FIGS. 5 through 8.

At block 1410 the base station 105 may generate a message comprising an indication of the resource allocation. The operations of block 1410 may be performed according to the methods described with reference to FIGS. 1 through 4. In certain examples, aspects of the operations of block 1410 may be performed by a message manager as described with reference to FIGS. 5 through 8.

At block 1415 the base station 105 may provide the message for transmission to the device. The operations of block 1415 may be performed according to the methods described with reference to FIGS. 1 through 4. In certain examples, aspects of the operations of block 1415 may be performed by a message manager as described with reference to FIGS. 5 through 8.

At block 1420 the base station 105 may identify, based at least in part on the message, a retransmission parameter, wherein the retransmission parameter comprises at least one of a value associated with a number of configured hybrid automatic repeat request (HARQ) processes, a retransmission identifier, or a sequential retransmission identifier. The operations of block 1420 may be performed according to the methods described with reference to FIGS. 1 through 4. In certain examples, aspects of the operations of block 1420 may be performed by a retransmission manager as described with reference to FIGS. 5 through 8.

Figure 15:
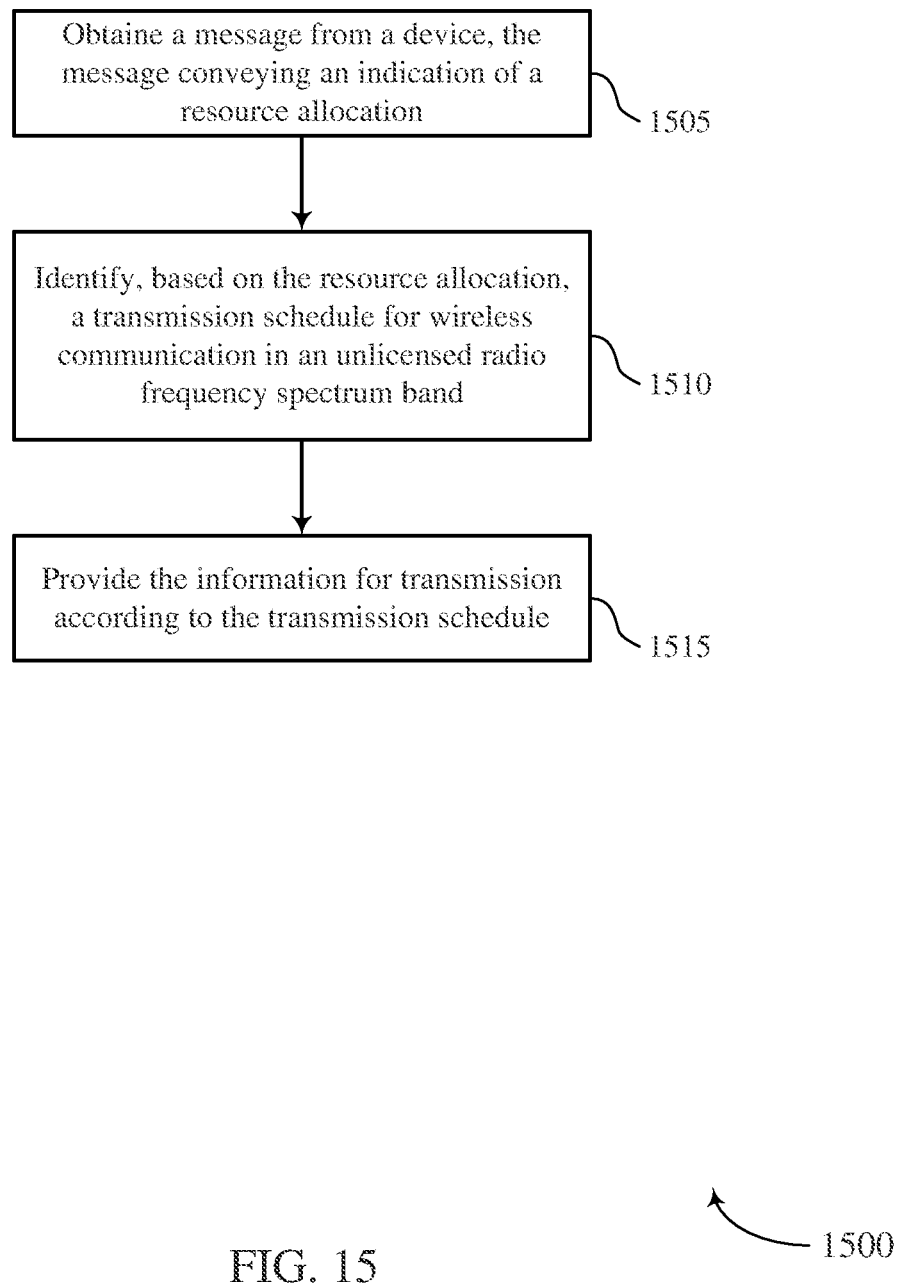

FIG. 15 shows a flowchart illustrating a method 1500 for semi-autonomous transmissions in accordance with various aspects of the present disclosure. The operations of method 1500 may be implemented by a UE 115 or its components as described herein. For example, the operations of method 1500 may be performed by a UE semi-autonomous transmission manager as described with reference to FIGS. 9 through 12. In some examples, a UE 115 may execute a set of codes to control the functional elements of the device to perform the functions described below. Additionally or alternatively, the UE 115 may perform aspects the functions described below using special-purpose hardware.

At block 1505 the UE 115 may obtain a message from a device, the message conveying an indication of a resource allocation. The operations of block 1505 may be performed according to the methods described with reference to FIGS. 1 through 4. In certain examples, aspects of the operations of block 1505 may be performed by a message manager as described with reference to FIGS. 9 through 12.

At block 1510 the UE 115 may identify, based at least in part on the resource allocation, a transmission schedule for wireless communication in an unlicensed radio frequency spectrum band. The operations of block 1510 may be performed according to the methods described with reference to FIGS. 1 through 4. In certain examples, aspects of the operations of block 1510 may be performed by a resource identifier as described with reference to FIGS. 9 through 12.

At block 1515 the UE 115 may provide the information for transmission according to the transmission schedule. The operations of block 1515 may be performed according to the methods described with reference to FIGS. 1 through 4. In certain examples, aspects of the operations of block 1515 may be performed by a message manager as described with reference to FIGS. 9 through 12.

Figure 16:
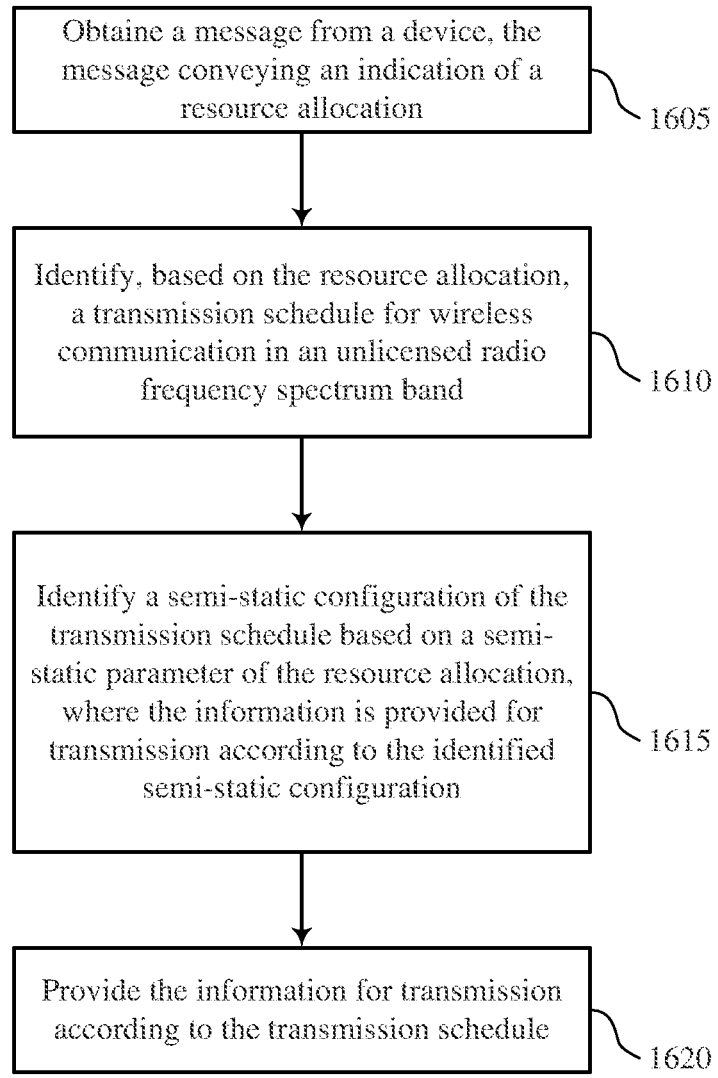

FIG. 16 shows a flowchart illustrating a method 1600 for semi-autonomous transmissions in accordance with various aspects of the present disclosure. The operations of method 1600 may be implemented by a UE 115 or its components as described herein. For example, the operations of method 1600 may be performed by a UE semi-autonomous transmission manager as described with reference to FIGS. 9 through 12. In some examples, a UE 115 may execute a set of codes to control the functional elements of the device to perform the functions described below. Additionally or alternatively, the UE 115 may perform aspects the functions described below using special-purpose hardware.

At block 1605 the UE 115 may obtain a message front a device, the message conveying an indication of a resource allocation. The operations of block 1605 may be performed according to the methods described with reference to FIGS. 1 through 4. In certain examples, aspects of the operations of block 1605 may be performed by a message manager as described with reference to FIGS. 9 through 12.

At block 1610 the UE 115 may identify, based at least in part on the resource allocation, a transmission schedule for wireless communication in an unlicensed radio frequency spectrum band. The operations of block 1610 may be performed according to the methods described with reference to FIGS. 1 through 4. In certain examples, aspects of the operations of block 1610 may be performed by a resource identifier as described with reference to FIGS. 9 through 12.

At block 1615 the UE 115 may identify a semi-static configuration of the transmission schedule based at least in part on a semi-static parameter of the resource allocation, wherein the information is provided for transmission according to the identified semi-static configuration. The operations of block 1615 may be performed according to the methods described with reference to FIGS. 1 through 4. In certain examples, aspects of the operations of block 1615 may be performed by a SPS manager as described with reference to FIGS. 9 through 12.

At block 1620 the UE 115 may provide the information for transmission according to the transmission schedule. The operations of block 1620 may be performed according to the methods described with reference to FIGS. 1 through 4. In certain examples, aspects of the operations of block 1620 may be performed by a message manager as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, 15-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells, Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein including, for example, wireless communications system 100 of FIG. 1 may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AA or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." The computer-program product may comprise packaging materials to advertise the computer-readable medium therein for purchase by consumers.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
a processing system configured to:
identify a semi-static resource allocation for a device based at least in part on a periodic resource schedule, the semi-static resource allocation being associated with wireless communication in an unlicensed radio frequency spectrum band; and
generate a message comprising an indication of the semi-static resource allocation and an indication of the periodic resource schedule; and
an interface configured to:
provide the message for transmission to the device.

2. The apparatus of claim 1, wherein the message comprises a radio resource control (RRC) message comprising a field in which the indication is conveyed.

3. The apparatus of claim 2, wherein the field comprises information associated with an autonomous transmission mode and semi-persistent scheduling (SPS) to be used by the apparatus and the device.

4. The apparatus of claim 1, wherein the semi-static resource allocation comprises a duration of an uplink transmission opportunity (TxOP) associated with the wireless communication.

5. The apparatus of claim 1, wherein the periodic resource schedule comprises a periodic schedule for transmission of one or more subframes by the device.

6. The apparatus of claim 1, wherein the semi-static resource allocation comprises a frequency domain allocation for transmission of one or more subframes by the device.

7. The apparatus of claim 6, wherein the frequency domain allocation is associated with one or more frequencies to be used by the device for frequency hopping.

8. The apparatus of claim 1, wherein the message comprises downlink control information (DCI) that comprises the indication, and further wherein the interface is configured to provide the DCI via a physical downlink control channel (PDCCH).

9. The apparatus of claim 8, wherein the indication comprises at least one of a periodicity parameter, a scheduling parameter, or a duration of a transmission opportunity (TxOP) associated with the wireless communication.

10. The apparatus of claim 1, wherein the message indicates a cross-transmission opportunity (cross-TxOP) to be used by the apparatus and the device.

11. The apparatus of claim 10, wherein the cross-TxOP comprises scheduling parameters identifying one or more time periods for transmission by the device.

12. The apparatus of claim 1, wherein the processing system is further configured to:
identify, based at least in part on the message, a retransmission parameter, wherein the retransmission parameter comprises at least one of a value associated with a number of configured hybrid automatic repeat request (HARQ) processes, a retransmission identifier, or a sequential retransmission identifier.

13. The apparatus of claim 1, wherein the interface is further configured to:
obtain a result of a channel access procedure prior to providing the message.

14. The apparatus of claim 13, wherein the channel access procedure comprises a full clear channel assessment (CCA) procedure.

15. The apparatus of claim 1, wherein:
the processing system is further configured to scramble downlink control information (DCI) of the message using a semi-persistent scheduling (SPS) radio network temporary identifier (RNTI); and
the message provided by the interface for transmission to the device comprises the scrambled DCI.

16. The apparatus of claim 1, wherein:
the processing system is further configured to generate a second message, wherein the second message comprises an indicator releasing the semi-static resource allocation; and
the interface is further configured to provide the second message for transmission to the device.

17. The apparatus of claim 16, wherein:
the processing system is further configured to scramble the indicator releasing the semi-static resource allocation using a semi-persistent scheduling (SPS) radio network temporary identifier (RNTI); and
the second message provided by the interface for transmission to the device comprises the scrambled indicator releasing the semi-static resource allocation.

18. The apparatus of claim 1, wherein the interface is further configured to:
obtain a retransmission of the wireless communication according to a retransmission scheme.

19. The apparatus of claim 18, wherein the retransmission scheme comprises an asynchronous hybrid automatic repeat request (HARQ).

20. The apparatus of claim 18, wherein the processing system is further configured to:

calculate, based at least in part on a temporal parameter associated with the wireless communication and a HARQ process count value, a retransmission identifier; and wherein the interface is further configured to obtain the retransmission of the wireless communication based at least in part on the calculated retransmission identifier.

21. An apparatus for wireless communication, comprising:
an interface configured to:
obtain a message from a device, the message conveying an indication of a semi-static resource allocation based at least in part on a periodic resource schedule; and
a processing system configured to:
identify, based at least in part on the semi-static resource allocation and the periodic resource schedule, a transmission schedule for wireless communication in an unlicensed radio frequency spectrum band; and
wherein the interface is configured to provide information for transmission according to the transmission schedule.

22. The apparatus of claim 21, wherein:
the processing system is further configured to identify a semi-static configuration of the transmission schedule based at least in part on a semi-static parameter of the semi-static resource allocation; and
the information is provided by the interface for transmission according to the identified semi-static configuration.

23. The apparatus of claim 21, wherein:
the processing system is further configured to identify, based at least in part on the semi-static resource allocation, a duration of an uplink transmission opportunity (TxOP) of the transmission schedule; and
the information is provided by the interface for transmission during the duration of the uplink TxOP.

24. The apparatus of claim 21, wherein:
the processing system is further configured to select, based at least in part on the message, an autonomous transmission mode and semi-persistent scheduling (SPS) for transmission of the information according to the transmission schedule; and
the information is provided by the interface for transmission using the selected autonomous transmission mode and the SPS.

25. The apparatus of claim 21, wherein:
the processing system is further configured to select, based at least in part on the periodic resource schedule, a periodicity of the transmission schedule; and
the information is provided by the interface for transmission according to the selected periodicity of the transmission schedule.

26. The apparatus of claim 21, wherein:
the processing system is further configured to select, based at least in part on the semi-static resource allocation, a retransmission scheme for retransmission of the information; and
the information is provided by the interface for transmission for transmission via the selected one or more frequencies.

27. The apparatus of claim 21, wherein:
the processing system is further configured to select, based at least in part on the semi-static resource allocation, a frequency hopping scheme for transmission of the information according to the transmission schedule; and the information is provided by the interface for transmission using the selected frequency hopping scheme.

28. The apparatus of claim 21, wherein:
the processing system is further configured to select, based at least in part on the semi-static resource allocation, a cross-transmission opportunity (cross-TxOP) for transmission of the information according to the transmission schedule; and
the information is provided by the interface for transmission during the selected cross-TxOP.

29. The apparatus of claim 21, wherein:
the processing system is further configured to select, based at least in part on the semi-static resource allocation, a retransmission scheme for retransmission of the information; and
the interface is further configured to provide the retransmission of the at least a portion of the information according to the selected retransmission scheme.

30. The apparatus of claim 29, wherein the retransmission scheme comprises an asynchronous hybrid automatic repeat request (HARQ) scheme.

31. The apparatus of claim 21, wherein the interface is configured to obtain a result of a channel access procedure prior to providing the information for transmission.

32. The apparatus of claim 31, wherein the channel access procedure comprises at least one of a full clear channel assessment (CCA) procedure, a one-shot CCA procedure, or a short CCA procedure.

33. The apparatus of claim 21, wherein the processing system is further configured to:
descramble downlink control information (DCI) of the message using a semi-persistent scheduling (SPS) radio network temporary identifier (RNTI); and
obtain the semi-static resource allocation based at least in part on the descrambled DCI.

34. The apparatus of claim 21, wherein:
the interface is further configured to obtain a second message from the device, wherein the second message comprises an indicator releasing the semi-static resource allocation;
the processing system is further configured to modify the transmission schedule based at least in part on the indicator releasing the semi-static resource allocation; and
the interface is further configured to stop providing the information for transmission based at least in part on the modified transmission schedule.

35. A method for wireless communication, comprising:
identifying a semi-static resource allocation for a device based at least in part on a periodic resource schedule, the semi-static resource allocation being associated with wireless communication in an unlicensed radio frequency spectrum band;
generating a message comprising an indication of the semi-static resource allocation and an indication of the periodic resource schedule; and
providing the message for transmission to the device.

36. The method of claim 35, wherein:
the message comprises a radio resource control (RRC) message comprising a field in which the indication is conveyed.

37. The method of claim 36, wherein:
the field comprises information associated with an autonomous transmission mode and semi-persistent scheduling (SPS) to be used by an apparatus and the device.

38. The method of claim 35, wherein:
the semi-static resource allocation comprises a duration of an uplink transmission opportunity (TxOP) associated with the wireless communication.

39. The method of claim 35, wherein:
the periodic resource schedule comprises a periodic schedule for transmission of one or more subframes by the device.

40. The method of claim 35, wherein:
the semi-static resource allocation comprises a frequency domain allocation for transmission of one or more subframes by the device.

41. The method of claim 40, wherein:
the frequency domain allocation is associated with one or more frequencies to be used by the device for frequency hopping.

42. The method of claim 35, wherein the message comprises downlink control information (DCI) that comprises the indication, further comprising:
providing the DCI via a physical downlink control channel (PDCCH).

43. The method of claim 42, wherein:
the indication comprises at least one of a periodicity parameter, a scheduling parameter, or a duration of a transmission opportunity (TxOP) associated with the wireless communication.

44. The method of claim 35, wherein:
the message indicates a cross-transmission opportunity (cross-TxOP) to be used by an apparatus and the device.

45. The method of claim 44, wherein:
the cross-TxOP comprises scheduling parameters identifying one or more time periods for transmission by the device.

46. The method of claim 35, further comprising:
identifying, based at least in part on the message, a retransmission parameter, wherein the retransmission parameter comprises at least one of a value associated with a number of configured hybrid automatic repeat request (HARQ) processes, a retransmission identifier, or a sequential retransmission identifier.

47. The method of claim 35, further comprising:
obtaining a result of a channel access procedure prior to providing the message.

48. The method of claim 47, wherein:
the channel access procedure comprises a full clear channel assessment (CCA) procedure.

49. The method of claim 35, further comprising:
scrambling downlink control information (DCI) of the message using a semi-persistent scheduling (SPS) radio network temporary identifier (RNTI), wherein the message provided for transmission to the device comprises the scrambled DCI.

50. The method of claim 35, further comprising:
generating a second message, wherein the second message comprises an indicator releasing the semi-static resource allocation; and
providing the second message for transmission to the device.

51. The method of claim 50, further comprising:
scrambling the indicator releasing the semi-static resource allocation using a semi-persistent scheduling (SPS) radio network temporary identifier (RNTI), wherein the second message provided for transmission to the device comprises the scrambled indicator releasing the semi-static resource allocation.

52. The method of claim 35, further comprising:
obtaining a retransmission of the wireless communication according to a retransmission scheme.

53. The method of claim 52, wherein:
the retransmission scheme comprises an asynchronous hybrid automatic repeat request (HARQ).

54. The method of claim 52, further comprising:
calculating, based at least in part on a temporal parameter associated with the wireless communication and a HARQ process count value, a retransmission identifier; and
obtaining the retransmission of the wireless communication based at least in part on the calculated retransmission identifier.

55. A method for wireless communication, comprising:
obtaining a message from a device, the message conveying an indication of a semi-static resource allocation based at least in part on a periodic resource schedule;
identifying, based at least in part on the semi-static resource allocation and the periodic resource schedule, a transmission schedule for wireless communication in an unlicensed radio frequency spectrum band; and
providing information for transmission according to the transmission schedule.

56. The method of claim 55, further comprising:
identifying a semi-static configuration of the transmission schedule based at least in part on a semi-static parameter of the semi-static resource allocation, wherein the information is provided for transmission according to the identified semi-static configuration.

57. The method of claim 55, further comprising:
identifying, based at least in part on the semi-static resource allocation, a duration of an uplink transmission opportunity (TxOP) of the transmission schedule, wherein the information is provided for transmission during the duration of the uplink TxOP.

58. The method of claim 55, further comprising:
selecting, based at least in part on the message, an autonomous transmission mode and semi-persistent scheduling (SPS) for transmission of the information according to the transmission schedule, wherein the information is provided for transmission using the selected autonomous transmission mode and the SPS.

59. The method of claim 55, further comprising:
selecting, based at least in part on the periodic resource schedule, a periodicity of the transmission schedule, wherein the information is provided for transmission according to the selected periodicity of the transmission schedule.

60. The method of claim 55, further comprising:
selecting, based at least in part on the semi-static resource allocation, a retransmission scheme for retransmission of the information, wherein the information is provided for transmission for transmission via the selected one or more frequencies.

61. The method of claim 55, further comprising:
selecting, based at least in part on the semi-static resource allocation, a frequency hopping scheme for transmission of the information according to the transmission schedule, wherein the information is provided for transmission using the selected frequency hopping scheme.

62. The method of claim 55, further comprising:
selecting, based at least in part on the semi-static resource allocation, a cross-transmission opportunity (cross-TxOP) for transmission of the information according to the transmission schedule, wherein the information is provided for transmission during the selected cross-TxOP.

63. The method of claim 55, further comprising:
selecting, based at least in part on the semi-static resource allocation, a retransmission scheme for retransmission of the information; and
providing the retransmission of the at least a portion of the information according to the selected retransmission scheme.

64. The method of claim 63, wherein:
the retransmission scheme comprises an asynchronous hybrid automatic repeat request (HARQ) scheme.

65. The method of claim 55, further comprising:
obtaining a result of a channel access procedure prior to providing the information for transmission.

66. The method of claim 65, wherein:
the channel access procedure comprises at least one of a full clear channel assessment (CCA) procedure, a one-shot CCA procedure, or a short CCA procedure.

67. The method of claim 55, further comprising:
descrambling downlink control information (DCI) of the message using a semi-persistent scheduling (SPS) radio network temporary identifier (RNTI); and
obtaining the semi-static resource allocation based at least in part on the descrambled DCI.

68. The method of claim 55, further comprising:
obtaining a second message from the device, wherein the second message comprises an indicator releasing the semi-static resource allocation;
modifying the transmission schedule based at least in part on the indicator releasing the semi-static resource allocation; and
stopping providing the information for transmission based at least in part on the modified transmission schedule.

69. An apparatus for wireless communication, comprising:
means for identifying a semi-static resource allocation for a device based at least in part on a periodic resource schedule, the semi-static resource allocation being associated with wireless communication in an unlicensed radio frequency spectrum band;
means for generating a message comprising an indication of the semi-static resource allocation and an indication of the periodic resource schedule; and
means for providing the message for transmission to the device.

70. The apparatus of claim 69, wherein:
the message comprises a radio resource control (RRC) message comprising a field in which the indication is conveyed.

71. The apparatus of claim 70, wherein:
the field comprises information associated with an autonomous transmission mode and semi-persistent scheduling (SPS) to be used by the method and the device.

72. The apparatus of claim 69, wherein:
the semi-static resource allocation comprises a duration of an uplink transmission opportunity (TxOP) associated with the wireless communication.

73. The apparatus of claim 69, wherein:
the periodic resource schedule comprises a periodic schedule for transmission of one or more subframes by the device.

74. The apparatus of claim 69, wherein:
the semi-static resource allocation comprises a frequency domain allocation for transmission of one or more subframes by the device.

75. The apparatus of claim 74, wherein:
the frequency domain allocation is associated with one or more frequencies to be used by the device for frequency hopping.

76. The apparatus of claim 69, wherein the message comprises downlink control information (DCI) that comprises the indication, further comprising:
means for providing the DCI via a physical downlink control channel (PDCCH).

77. The apparatus of claim 76, wherein:
the indication comprises at least one of a periodicity parameter, a scheduling parameter, or a duration of a transmission opportunity (TxOP) associated with the wireless communication.

78. The apparatus of claim 76, wherein:
the cross-TxOP comprises scheduling parameters identifying one or more time periods for transmission by the device.

79. The apparatus of claim 69, wherein:
the message indicates a cross-transmission opportunity (cross-TxOP) to be used by the apparatus and the device.

80. The apparatus of claim 69, further comprising:
means for identifying, based at least in part on the message, a retransmission parameter, wherein the retransmission parameter comprises at least one of a value associated with a number of configured hybrid automatic repeat request (HARQ) processes, a retransmission identifier, or a sequential retransmission identifier.

81. The apparatus of claim 69, further comprising:
means for obtaining a result of a channel access procedure prior to providing the message.

82. The apparatus of claim 81, wherein:
the channel access procedure comprises a full clear channel assessment (CCA) procedure.

83. The apparatus of claim 69, further comprising:
means for scrambling downlink control information (DCI) of the message using a semi-persistent scheduling (SPS) radio network temporary identifier (RNTI), wherein the message provided for transmission to the device comprises the scrambled DCI.

84. The apparatus of claim 69, further comprising:
means for generating a second message, wherein the second message comprises an indicator releasing the semi-static resource allocation; and
means for providing the second message for transmission to the device.

85. The apparatus of claim 84, further comprising:
means for scrambling the indicator releasing the semi-static resource allocation using a semi-persistent scheduling (SPS) radio network temporary identifier (RNTI), wherein the second message provided for transmission to the device comprises the scrambled indicator releasing the semi-static resource allocation.

86. The apparatus of claim 69, further comprising:
means for obtaining a retransmission of the wireless communication according to a retransmission scheme.

87. The apparatus of claim 86, wherein:
the retransmission scheme comprises an asynchronous hybrid automatic repeat request (HARQ).

88. The apparatus of claim 86, further comprising:
means for calculating, based at least in part on a temporal parameter associated with the wireless communication and a HARQ process count value, a retransmission identifier; and means for obtaining the retransmission of the wireless communication based at least in part on the calculated retransmission identifier.

89. An apparatus for wireless communication, comprising:
means for obtaining a message from a device, the message conveying an indication of a semi-static resource allocation based at least in part on a periodic resource schedule;
means for identifying, based at least in part on the semi-static resource allocation and the periodic resource schedule, a transmission schedule for wireless communication in an unlicensed radio frequency spectrum band; and
means for providing information for transmission according to the transmission schedule.

90. The apparatus of claim 89, further comprising:
means for identifying a semi-static configuration of the transmission schedule based at least in part on a semi-static parameter of the semi-static resource allocation, wherein the information is provided for transmission according to the identified semi-static configuration.

91. The apparatus of claim 89, further comprising:
means for identifying, based at least in part on the semi-static resource allocation, a duration of an uplink transmission opportunity (TxOP) of the transmission schedule, wherein the information is provided for transmission during the duration of the uplink TxOP.

92. The apparatus of claim 89, further comprising:
means for selecting, based at least in part on the message, an autonomous transmission mode and semi-persistent scheduling (SPS) for transmission of the information according to the transmission schedule, wherein the information is provided for transmission using the selected autonomous transmission mode and the SPS.

93. The apparatus of claim 89, further comprising:
means for selecting, based at least in part on the periodic resource schedule, a periodicity of the transmission schedule, wherein the information is provided for transmission according to the selected periodicity of the transmission schedule.

94. The apparatus of claim 89, further comprising:
means for selecting, based at least in part on the semi-static resource allocation, a retransmission scheme for retransmission of the information, wherein the information is provided for transmission for transmission via the selected one or more frequencies.

95. The apparatus of claim 89, further comprising:
means for selecting, based at least in part on the semi-static resource allocation, a frequency hopping scheme for transmission of the information according to the transmission schedule, wherein the information is provided for transmission using the selected frequency hopping scheme.

96. The apparatus of claim 89, further comprising:
means for selecting, based at least in part on the semi-static resource allocation, a cross-transmission opportunity (cross-TxOP) for transmission of the information according to the transmission schedule, wherein the information is provided for transmission during the selected cross-TxOP.

97. The apparatus of claim 89, further comprising:
means for selecting, based at least in part on the semi-static resource allocation, a retransmission scheme for retransmission of the information; and
means for providing the retransmission of the at least a portion of the information according to the selected retransmission scheme.

98. The apparatus of claim 97, wherein:
the retransmission scheme comprises an asynchronous hybrid automatic repeat request (HARQ) scheme.

99. The apparatus of claim 89, further comprising:
means for obtaining a result of a channel access procedure prior to providing the information for transmission.

100. The apparatus of claim 99, wherein:
the channel access procedure comprises at least one of a full clear channel assessment (CCA) procedure, a one-shot CCA procedure, or a short CCA procedure.

101. The apparatus of claim 89, further comprising:
means for descrambling downlink control information (DCI) of the message using a semi-persistent scheduling (SPS) radio network temporary identifier (RNTI); and
means for obtaining the semi-static resource allocation based at least in part on the descrambled DCI.

102. The apparatus of claim 89, further comprising:
means for obtaining a second message from the device, wherein the second message comprises an indicator releasing the semi-static resource allocation;
means for modifying the transmission schedule based at least in part on the indicator releasing the semi-static resource allocation; and
means for stopping providing the information for transmission based at least in part on the modified transmission schedule.

103. A non-transitory computer readable medium storing code for wireless communication at an apparatus, the code comprising instructions executable to cause a processor to:
identify a semi-static resource allocation for a device based at least in part on a periodic resource schedule, the semi-static resource allocation being associated with wireless communication in an unlicensed radio frequency spectrum band;
generate a message comprising an indication of the semi-static resource allocation and an indication of the periodic resource schedule; and
provide the message for transmission to the device.

104. A non-transitory computer readable medium storing code for wireless communication at an apparatus, the code comprising instructions executable to cause a processor to:
obtain a message from a device, the message conveying an indication of a semi-static resource allocation based at least in part on a periodic resource schedule;
identify, based at least in part on the semi-static resource allocation and the periodic resource schedule, a transmission schedule for wireless communication in an unlicensed radio frequency spectrum band; and
provide information for transmission according to the transmission schedule.

105. A base station, comprising:
a processing system configured to:
identify a semi-static resource allocation for a device based at least in part on a periodic resource schedule, the semi-static resource allocation being associated with wireless communication in an unlicensed radio frequency spectrum band; and
generate a message comprising an indication of the semi-static resource allocation and an indication of the periodic resource schedule; and
a transmitter configured to transmit the message to the device.

106. A user equipment, comprising:
a receiver configured to obtain a message from a device, the message conveying an indication of a semi-static resource allocation based at least in part on a periodic resource schedule; and
a processing system configured to;
identify, based at least in part on the semi-static resource allocation and the periodic resource schedule, a transmission schedule for wireless communication in an unlicensed radio frequency spectrum band; and
a transmitter configured to transmit information according to the transmission schedule.

* * * * *